US007826744B2

(12) United States Patent
Miyata et al.

(10) Patent No.: US 7,826,744 B2
(45) Date of Patent: Nov. 2, 2010

(54) OPTICAL NETWORK SYSTEM AND TRANSMISSION APPARATUS

(75) Inventors: Hideyuki Miyata, Kawasaki (JP); Goji Nakagawa, Kawasaki (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 895 days.

(21) Appl. No.: 11/313,960

(22) Filed: Dec. 22, 2005

(65) Prior Publication Data

US 2006/0171715 A1 Aug. 3, 2006

(30) Foreign Application Priority Data

Jan. 31, 2005 (JP) ............................. 2005-024235

(51) Int. Cl.
*H04B 10/20* (2006.01)
*H04J 14/02* (2006.01)
(52) U.S. Cl. ............................. 398/61; 398/58; 398/59; 398/63; 398/89
(58) Field of Classification Search ................... 398/58, 398/59, 60, 61, 62, 63, 64, 89
See application file for complete search history.

(56) References Cited

U.S. PATENT DOCUMENTS

| 5,801,861 | A  | * | 9/1998  | Majima         | 398/95 |
| 6,643,463 | B1 | * | 11/2003 | Suzuki et al.  | 398/49 |
| 7,298,974 | B2 | * | 11/2007 | Tanobe et al.  | 398/63 |
| 7,298,975 | B2 | * | 11/2007 | Parker         | 398/66 |
| 7,321,729 | B2 | * | 1/2008  | Gumaste et al. | 398/59 |
| 2003/0228148 | A1 |  | 12/2003 | Miyata et al.  | 398/59 |
| 2004/0184809 | A1 |  | 9/2004  | Miyata et al.  | 398/85 |
| 2004/0240884 | A1 | * | 12/2004 | Gumaste et al. | 398/59 |

FOREIGN PATENT DOCUMENTS

| EP | 1 339 179        |    | 8/2003  |
| EP | 1339179       A2 | *  | 8/2003  |
| JP | 2001-358697      |    | 12/2001 |
| JP | 2003-174459      |    | 6/2003  |
| JP | 2004-15729       |    | 1/2004  |
| JP | 2004-235741      |    | 8/2004  |
| WO | WO 99/37050      |    | 7/1999  |
| WO | WO 00/64078      |    | 10/2000 |
| WO | WO 2004073225 A1 | *  | 8/2004  |

OTHER PUBLICATIONS

Goodman, Matthew, S., "The LAMBDANET Multiwavelength Network: Architecture, Applications, and Demonstrations", Aug. 1990, IEEE Journal on Selected Areas in Communications, vol. 8, No. 6, pp. 995-1004.*

(Continued)

*Primary Examiner*—Ken N Vanderpuye
*Assistant Examiner*—Daniel G Dobson
(74) *Attorney, Agent, or Firm*—Staas & Halsey LLP

(57) ABSTRACT

An optical network system is disclosed by which flexible wavelength path setting can be performed in accordance with tree-shaped and star-shaped network topology. A central node includes a multiplexing section for multiplexing optical signals transmitted from user nodes and inputted thereto, and a central node side branching section for branching the optical signal multiplexed by the multiplexing section and supplying the branched optical signals to the user nodes. Each of the user nodes includes a transmission section capable of outputting an optical signal to which transmission wavelengths different from those of the other user nodes are set, and a reception section for extracting selected optical wavelength components from the branched light supplied thereto from the central node side branching section and extracting optical signals from the extracted optical wavelength components.

18 Claims, 19 Drawing Sheets

OTHER PUBLICATIONS

Japanese Notice of Reasons for Rejection in correspondence to Japanese Patent Application No. 2005-024235 mailed on Jul. 13, 2010.

Translation of Notice of Reasons for Rejection issued on Jul. 13, 2010 in corresponding Japanese Patent Application No. 2005-124235, which was submitted previously with an Information Disclosure Statement filed on Jul. 16, 2010.

Partial Translation of JP2003-174459, which was submitted previously with an Information Disclosure Statement filed on Jul. 16, 2010.

* cited by examiner

OPTICAL NETWORK SYSTEM AND TRANSMISSION APPARATUS

BACKGROUND OF THE INVENTION

1) Field of the Invention

This invention relates to an optical network system and more particularly to an optical network system and a transmission apparatus suitable for use with an optical communication system of an access region.

2) Description of the Related Art

In recent years, a broadband dedicated line service for which Gigabit Ethernet (registered trademark) or 10 Gigabit Ethernet for an enterprise network is used has been started. Also homes are being equipped with high-speed Internet environment such as ADSL (Asymmetric Digital Subscriber Line) and FTTH (Fiber To The Home) of a gigabit class. Further, environment is being prepared wherein various undertakers can provide various services such as content distribution, data center services and so forth.

Accordingly, the data transfer capacity is radically increasing in a network of an access region comparatively near to users who enjoy provision of such services as described above. Further, in communication in an access region, because of the great variation in data transfer demand due to alteration of service contents or alteration, increasing or decreasing of communication bases, a network is required which can be ready not only for provision of a broadband path but also for increasing or decreasing installation of such paths and flexible alternation of routes.

In a present situation, increase of the capacity and extension of the length of trunk system networks are being progressed radically and reduction of the cost for transmission lines can be achieved by a wavelength division multiplexing (WDM) transmission technique and an optical amplification technique. However, when compared with the progress of the trunk system networks, in networks for an access region, speed of development is slow in terms of expansion of the throughput and reduction of the cost required for a node for distributing transmission signals to users at each point. Increase of the signal processing capacity and cost reduction of nodes are essentially required for efficient working and construction of a network.

FIG. 19 is a block diagram showing a network 500 for an access region. The network 500 shown in FIG. 19 includes a central node 510 and nodes 511-1 to 511-n connected to the central node 510, and forms a star-shaped network which is adopted comparatively frequently in a network for an access region.

Referring to FIG. 19, the node 510 shown includes optic/electric interfaces 501-1 to 501-n for converting optical signals inputted thereto from the adjacent nodes 511-1 to 511-n into electric signals to be outputted, a crossbar switch 502 for exchanging the electric signals from the optic/electric interfaces 501-1 to 501-n, and electric/optic interfaces 503-1 to 503-n for converting the electric signals exchanged by the crossbar switch 502 into optical signals and outputting the optical signals to the corresponding adjacent nodes 511-1 to 511-n.

In the node 510 shown in FIG. 19 having such a configuration as described above, for example, an optical signal from the node 511-l is converted once into an electric signal by the optic/electric interface 501-1, and switching is performed for the electric signal by the crossbar switch 502 at an electric stage. Thereafter, the electric signal is converted back into an optical signal by the electric/optic interface 503-2 (or interface 503-3 to 503-n), and the optical signal is outputted. Consequently, in the node 510, a signal from an adjacent one (for example, node 511-1) of the nodes which form the star-shaped network can be distributed to a different node 511-2 (or node 511-3 to 511-n). The distribution is performed similarly also in other node to node communication.

In the network 500 described above, if the number of wavelengths of optical signals which can be used by the nodes 511-1 to 511-n is set, for example, to four, then the throughput can be increased in comparison with that in an alternative case wherein a number of waves smaller than four, for example one wave. In this instance, it is necessary for the optic/electric interfaces 501-1 to 501-n to individually include an optical branching section 501a, a number of O/E (Optic/Electric) sections 501b corresponding to the number of increased optical wavelengths, and also it is necessary for the electric/optic interfaces 503-1 to 503-n to individually include a number of E/O (Electric/Optic) sections 503a corresponding to the number of increased optical wavelengths and a multiplex section 503b.

It is to be noted that, as a technique relating to the invention of the present application, a technique for performing a process in a unit of an optical path is disclosed in Japanese Patent Laid-Open No. 2001-358697 (hereinafter referred to as Patent Document 1). In Patent Document 1, a wavelength router is disclosed wherein optical wavelengths to be inputted and outputted between right ports #1 to #4 and left ports #1 to #4 are transferred such that four wavelengths λ1 to λ4 may not overlap with each other so that the same wavelengths may not overlap with each other in an optical fiber between wavelength routers and between ONUs (Optical Network Units).

Further, as a publicly known technique relating to the invention of the present invention, another technique is disclosed in Japanese Patent Laid-Open No. 2004-235741 (hereinafter referred to as Patent Document 2) or Japanese Patent Laid-Open No. 2004-15729 (hereinafter referred to as Patent Document 3).

However, in the configuration of the node 500 shown in FIG. 19, if the information processing capacity of the node apparatus is increased by a conventional photoelectric conversion method or electric switching method in order to expand the throughput of the network, then the node cost increases and the scale of the apparatus increases. Particularly, as shown in FIG. 19, if the number of wavelengths of optical signals which can be used by the nodes 511-1 to 511-n is increased from one to, for example, four in order to increase the throughput, then the number of signal channels increases and the number of exchanging ports of the crossbar switch 502 cumulatively increases. Therefore, the node cost increases and the scale of the apparatus increases.

As described above, in a network for an access region, the variation of data transfer demand is very great due to alternation of service contents or alternation, increasing or decreasing installation or the like of communication bases. Therefore, for example, in a case wherein processing of only several waves is involved, in another case wherein several waves are used upon initial introduction but the number of wavelengths to be processed is increased after the introduction or in a like case, a network is required which is capable of being ready for flexible route alteration in response to increasing or decreasing installation of paths. In the case described above with reference to FIG. 19, with the hope that may secure a broadband, the initial introduction cost is high and the apparatus cost per one wavelength is high.

Accordingly, in order to implement increase of the processing capacity of nodes, economization and downsizing, it is desired also for a network for an access region to have a network configuration wherein an electronic circuit of a large scales is replaced by optical parts such that the network can process in a unit of an optical path in an optical wavelength region and include nodes having a corresponding configuration.

However, all of node apparatus which are on the market at present and which are ready for a tree-shaped or star-shaped network configuration for an access region are of a fixed wavelength path type determined in advance. While the cost of the node apparatus is low, when it is tried to change wavelength path connections for interconnecting different points, setting variation by manual operation is required. Therefore, it is difficult to be flexibly ready for path connection change in response to a short term data transfer demand.

Also the technique disclosed in Patent Document 2 mentioned above relates to a network of the fixed wavelength path type determined in advance, and, in order to increase the number of wavelengths which can be handled in a unit node, also a wavelength router itself must be prepared separately. Therefore, it is difficult to flexibly alter the number of wavelengths to be used in a node in the network.

It is to be noted that the technique disclosed in Patent Document 3 is directed to implementation of such flexible wavelength path setting as described above in a network configuration of ring topology. However, the node configuration disclosed in Patent Document 3 cannot be applied to a node in a network system which adopts star-shaped or tree-shaped topology which is used frequently in an access region.

SUMMARY OF THE INVENTION

It is an object of the present invention to provide an optical network system and a transmission apparatus by which flexible wavelength path setting can be performed in accordance with tree-shaped and star-shaped network topology.

In order to attain the object described above, according to an aspect of the present invention, there is provided an optical network system comprising a central node, and a plurality of user nodes connected to the central node through transmission lines such that optical signals can be transmitted and received between the user nodes through the central node, the central node including a multiplexing section for multiplexing optical signals transmitted from the user nodes and inputted thereto through the transmission lines and a central node side branching section for branching the optical signal multiplexed by the multiplexing section and supplying the branched optical signals to the user nodes through the transmission lines, each of the user nodes including a transmission section capable of outputting optical signals to which transmission wavelengths different from those of the other user nodes are set and a reception section for extracting selected optical wavelength components from within the branched light supplied thereto from the central node side branching section and extracting reception signals from the extracted optical wavelength components.

The optical network system may be configured such that the central node side branching section power-branches the optical signal multiplexed by the multiplexing section and outputs the branched signals to the corresponding user nodes, and the reception section of each of the user nodes includes a user node side branching section capable of power-branching the branched light from the central node into a plurality of lights, a plurality of variable wavelength filters capable of extracting optical wavelength components variably and selectively set from among the lights power-branched by the user node side branching section, and a plurality of reception signal extraction sections for individually extracting reception signals from the optical wavelength components extracted by the variable wavelength filters.

Preferably, a bidirectionally shared optical fiber for connection between the central node and each of the user nodes is provided for the optical transmission lines and has a pair of optical circulators provided at the opposite ends thereof.

In this instance, the optical network system may be configured such that the transmission section and the reception section of each of the user nodes have a redundant configuration and also the bidirectionally shared optical fiber has a redundant configuration. Or, the optical network system may be configured such that the transmission section and the reception section of each of the user nodes have a redundant configuration and also the bidirectionally shared transmission line fiber and the central node have a redundant configuration.

Preferably, a star-shaped network topology is formed from the central node and the user nodes.

Alternatively, a tree-shaped network topology may be formed from the central nodded and the user nodes.

According to another aspect of the present invention, there is provided an optical network system comprising a central node, and a plurality of user nodes connected to the central node through transmission lines such that optical signals can be transmitted and received between the user nodes through the central node, the central node including a ring transmission line and a plurality of branching/insertion sections successively interposed on the ring transmission line for branching/inserting optical signals between the ring transmission line and the user nodes, each of the branching/insertion sections including a central node side multiplexing section for multiplexing optical signals from the corresponding user node with light on the ring transmission line, a passage blocking section for blocking wavelength components of the light propagated along the ring transmission line which correspond to wavelength components of the optical signals from the corresponding user node from passing therethrough to the branching/insertion section on the downstream side, and a central node side branching section for branching and outputting the light propagating along the ring transmission line to the corresponding user node, each of the user nodes including a transmission section capable of outputting optical signals to which transmission wavelengths different from those of the other user nodes are set and a reception section for extracting selected optical wavelength components from within the branched light supplied thereto from the corresponding central node side branching section and extracting reception signals from the extracted light wavelength components.

The optical network system may be configured such that the central node side branching section power-branches the light propagated along the ring transmission line and outputs the branched lights to the corresponding user nodes, and the reception section of each of the user nodes includes a user node side branching section capable of power-branching the branched light from the central node into a plurality of lights, a plurality of variable wavelength filters capable of extracting optical wavelength components variably and selectively set from among the lights power-branched by the user node side branching section, and a plurality of reception signal extraction sections for individually extracting reception signals from the optical wavelength components extracted by the variable wavelength filters.

According to a further aspect of the present invention, there is provided an optical network system comprising a central node, and a plurality of user nodes connected to the central node through transmission lines such that optical signals can be transmitted and received between the user nodes through the central node, the central node including a central node side multiplexing section for multiplexing optical signals transmitted from the user nodes and inputted thereto through the transmission lines and a central node side branching section for branching the optical signal multiplexed by the central node side multiplexing section and supplying the branched optical signals to the user nodes through the transmission lines, each of the user nodes including a transmission section capable of outputting a plurality of optical signals having variable optical wavelength components different from each other to the central node and a reception section for extracting reception signals from optical signals, which have reception wavelengths set so as to be different from those in the user nodes, of the branched light supplied thereto from the central node side branching section.

Preferably, the central node side branching section is formed from a wavelength branching filter for branching the optical signals multiplexed by the central node side multiplexing section for individual reception wavelength components set to the corresponding user node, and each of the reception sections of the user nodes includes a user node side branching section for branching the branched light branched by the wavelength branching filter for the individual reception wavelength components and a plurality of reception signal extraction sections for extracting reception signals from the optical signals branched by the user node side branching section.

Preferably, the optical network system further comprises a management apparatus for managing transmission wavelengths of the user nodes so that the transmission wavelengths of the optical signals transmitted from each of the user nodes are different from those of other user nodes.

Preferably, the transmission section of each of the user nodes includes a plurality of variable wavelength transmission light outputting sections capable of outputting optical signals of variable optical wavelengths different from each other and a user node side multiplexing section for multiplexing the optical signals from the variable wavelength transmission light outputting sections.

Preferably, the transmission section of each of the user nodes includes a plurality of fixed wavelength transmission light outputting sections capable of outputting optical signals having fixed wavelengths different from each other and a user node side multiplexing section for multiplexing the optical signals from the fixed wavelength transmission light outputting sections.

According to a still further aspect of the present invention, there is provided an optical network system comprising a central node, and a plurality of user nodes connected to the central node through transmission lines such that optical signals can be transmitted and received between the user nodes through the central node, the central node including a ring transmission line and a plurality of branching/insertion sections successively interposed on the ring transmission line for branching/inserting optical signals between the ring transmission line and the user nodes, each of the branching/insertion sections including a central node side multiplexing section for multiplexing optical signals from the corresponding user node with light on the ring transmission line and a central node side branching section for branching the light propagated along the ring transmission line and outputting the branched light to the corresponding user node, each of the branching/insertion sections being configured so as to block wavelength components of the light propagated along the ring transmission line which correspond to wavelength components of the optical signals from the corresponding user node from passing therethrough to the branching/insertion section on the downstream side, each of the user nodes including a transmission section capable of outputting a plurality of optical signals having variable optical wavelength components different from each other to the central node and a reception section for extracting optical signals to which reception wavelengths different from those of the other user nodes are set from within the branched light supplied thereto from the central node side branching section and extracting reception signals from the extracted optical wavelength components.

The optical network system may be configured such that the central node side branching section of each of the branching/insertion sections is formed from a reject filter for blocking, from among the optical signals on the ring transmission line, transmission wavelength component to the corresponding user node and a drop filter for branching, from within the optical signal on the ring transmission line, reception wavelength components set to the corresponding user node and passing any other wavelength component therethrough, and the reception section of each of the user nodes includes a user node side branching section for branching the branched light branched by the wavelength branching filter of the corresponding branching and insertion section for the individual reception wavelength components and a plurality of reception signal extraction sections for extracting reception signals from the optical signals branched by the user node side branching section.

According to a yet further aspect of the present invention, there is provided a transmission apparatus comprising a configuration of the central node in the optical network system described above.

According to a yet further aspect of the present invention, there is provided a transmission apparatus comprising a configuration of the user nodes in the optical network system described above.

In the optical network systems and the transmission apparatus, the central node and the user nodes allow flexible setting of connections between arbitrary ones of the user nodes in a unit of a wavelength path with a simple configuration by provisioning in accordance with network topology of the tree type or the star type, and various services to the user can be accommodated.

Further, also where the number of wavelength channels to be used is to be increased or decreased in the individual user nodes, such increase or decrease of the number of wavelength channels can be coped with readily without the necessity to change the equipment over the entire optical network system. In other words, the function of being capable of changing or setting the connections flexibly can be provided. Therefore, there is an advantage that alteration of the optical network configuration which cannot be implemented readily by conventional systems can be implemented and the network can be constructed flexibly and economically.

Furthermore, since the configuration is simple and the insertion loss of light which passes through the nodes is low, the number of optical amplifiers for the compensation for the insertion loss can be reduced and the network cost can be further reduced. Further, by setting the number of wavelength channels for transmission and reception in each user node to a small number of wavelengths, the cost for introduction of the system can be reduced.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

[A1] First Embodiment

[A1-1] Configuration

Figure 1:
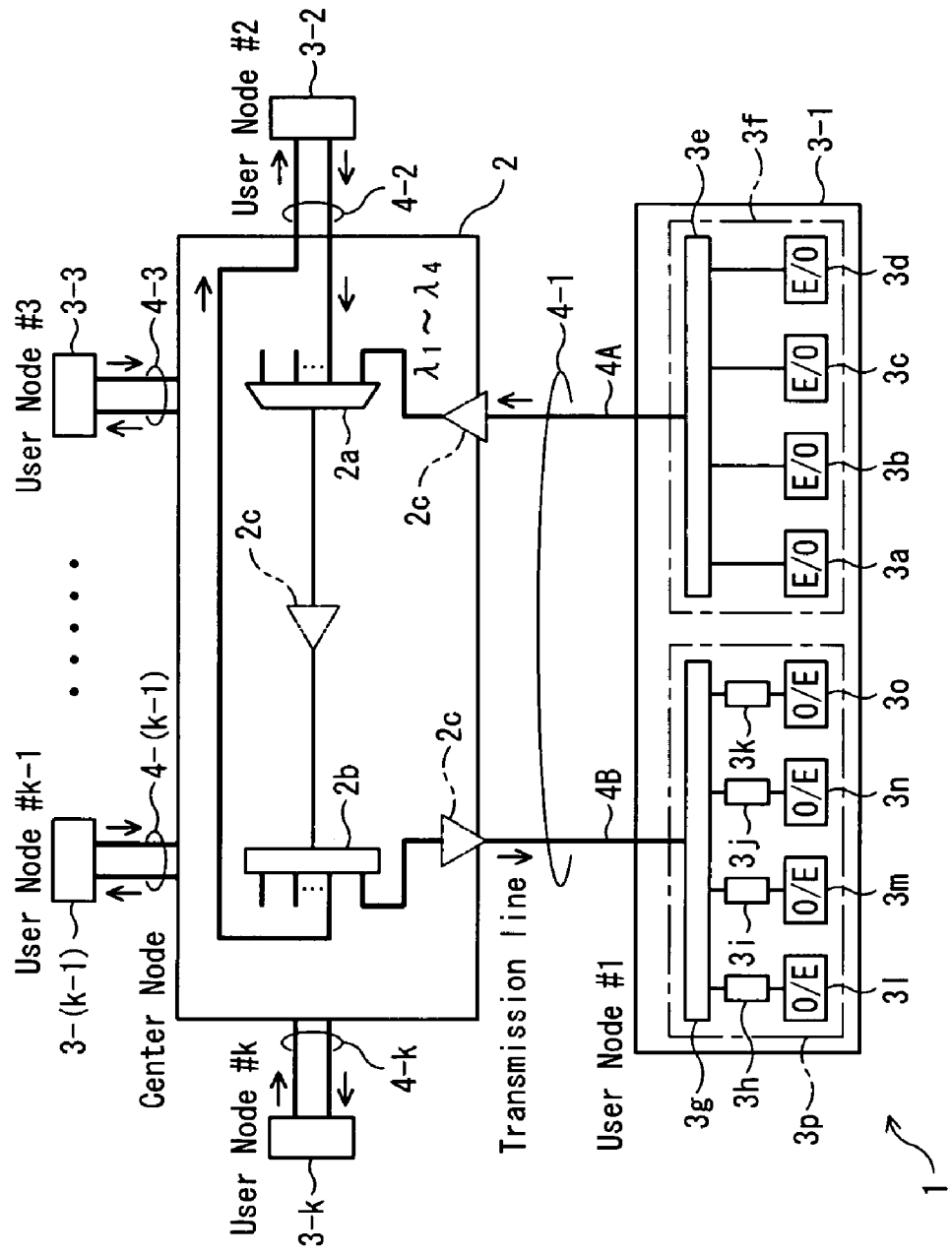
FIG. 1 is a block diagram showing an optical network system according to a first embodiment of the present invention.

FIG. 1 is a block diagram showing an optical network system 1 according to a first embodiment of the present invention. Referring to FIG. 1, the optical network system 1 shown includes a central node 2 which is a transmission apparatus, a plurality of user nodes (User Node #1 to #k) 3-1 to 3-k which are transmission apparatus connected to the central node 2 through transmission lines 4-1 to 4-k, respectively, and transmits and receives optical signals between the user nodes 3-1 to 3-k (k is a plural number and is, in this instance, 5 or more) through the central node 2.

In particular, the optical network system 1 can be formed not only in star-shaped network topology wherein the user nodes 3-1 to 3-k are connected radially from the central node 2 and but also in tree-shaped network topology wherein signals can be distributed from a specific user node (for example, user node 3-1) to the other user nodes (for example, user nodes 3-2 to 3-k) through the central node 2.

It is to be noted that each of the transmission lines 4-1 to 4-k described above has a two-optical fiber configuration including an optical fiber 4A for allowing an optical signal to propagate from the user node 3-1 (3-2 to 3-k) to the central node 2 and an optical fiber 4B for allowing an optical signal to propagate from the central node 2 to the user node 3-1 (3-2 to 3-k) (in FIG. 1, reference characters are added only to the optical fibers 4A and 4B of the transmission line 4-1).

The central node 2 includes a multiplexing section 2a for multiplexing optical signals transmitted from the user nodes 3-1 to 3-k and inputted thereto through the transmission lines 4-1 to 4-k and a central node side branching section 2b for power-branching the optical signal multiplexed by the multiplexing section 2a and supplying the branched optical signals to the user nodes 3-1 to 3-k through the transmission lines 4-1 to 4-k. It is to be noted that, in FIG. 1, connections between the user nodes 3-3 to 3-k and the multiplexing section 2a and connections between the user nodes 3-3 to 3-k and the central node side branching section 2b are not shown.

It is to be noted that reference character 2c denotes an optical amplifier suitably provided at a necessary location on any light propagation route in the central node 2 (for example, at an optical signal reception end from the optical fiber 4A, an optical signal transmission end to the optical fiber 4B, or an intermediate location between the multiplexing section 2a and the central node side branching section 2b). Further, similarly as in the central node 2, an optical amplifier can be interposed suitably also on any of light propagation routes in the transmission lines 4-1 to 4-k and the user nodes 3-1 to 3-k as occasion demands.

Each of the user nodes 3-1 to 3-k includes a transmission section 3f capable of outputting an optical signal to which transmission wavelengths different from those in the other user nodes are set to the central node 2 and a reception section 3p for extracting selected optical wavelength components from branched light supplied thereto from the central node side branching section 2b and extracting reception signals from the extracted optical wavelength components. It is to be noted that the transmission sections 3f and the reception sections 3p of the user nodes 3-2 to 3-k are not shown in FIG. 1.

Here, if attention is paid to the user node 3-1, the transmission section 3f includes fixed wavelength transmission light outputting sections 3a to 3d capable of outputting optical signals of, for example, four different fixed wavelength channels $\lambda 1$ to $\lambda 4$ and a user node side multiplexing section 3e for multiplexing the optical signals from the fixed wavelength transmission light outputting sections 3a to 3d.

Also each of the user nodes 3-2 to 3-k can include, for example, four fixed wavelength transmission light outputting sections. In this instance, each of the user nodes 3-2 to 3-k can output optical signals of four different wavelength channels which are all different from those of the other user nodes. In other words, k user nodes 3-1 to 3-k are formed such that the transmission wavelengths thereof do not overlap with each other as a whole. Therefore, for example, 4k wavelength channels $\lambda 1$ to $\lambda 4k$ can be set as the transmission wavelengths.

At this time, in the central node 2, optical signals of the 4k wavelength channels are multiplexed by the multiplexing section 2a, and power-branched lights of the optical signals of the 4k wavelength channels can be outputted to the reception sections of the user nodes 3-1 to 3-k from the central node side branching section 2b.

Meanwhile, the reception section 3p of the user node 3-1 includes a user node side branching section 3g capable of power-branching branched light from the central node 2 into a plurality of (for example, four) lights, four variable wavelength filters 3h to 3k capable of extracting selectively and variably set optical wavelength components from the four lights power-branched by the user node side branching section 3g, and four reception signal extraction sections 3l to 3o for extracting reception signals from the optical wavelength components extracted by the four variable wavelength filters 3h to 3k.

Thus, the four variable wavelength filters $3h$ to $3k$ can extract optical signals of four arbitrary wavelength channels from among the optical signals from the central node side branching section $2b$ (from among the optical signals of $4k$-$4$ wavelength channels transmitted from the user nodes $3$-$2$ to $3$-$k$ other than the wavelength channels transmitted from the user node $3$-$1$) by setting wavelength components which are to pass through the variable wavelength filters $3h$ to $3k$.

It is to be noted that the user nodes $3$-$1$ to $3$-$k$ can select and transmit, from among the wavelengths set as transmission wavelengths, a suitable number of wavelengths depending upon a wavelength band used, and can select a suitable number of wavelengths depending upon a wavelength band used for reception wavelengths.

Further, the multiplexing section $2a$ in the central node $2$ described above can be formed from an optical coupler. However, if the multiplexing section $2a$ is formed a group type multiplexer wherein the wavelength band to be multiplexed is defined in response to the position of a port to be used for inputting, then even if light of a transmission wavelength different from that of the multiplexing section $2a$ is inputted as optical signals from the user nodes $3$-$1$ to $3$-$k$ to the multiplexing section $2a$, the multiplexing section $2a$ can prevent outputting of such light as just described to the central node side branching section $2b$ side. Further, the central node side branching section $2b$ and the user node side branching section $3g$ can individually be formed, for example, from an optical coupler, and the optical multiplexing section $3e$ in the transmission section $3f$ can be formed, for example, from an optical coupler or an optical multiplexer.

Further, the number (4) of wavelength channels of optical signals which can be transmitted in a unit of a user node and the number (4) of wavelength channels from which reception signals can be extracted are an example, and it is possible to transmit optical signals of a number of wavelength channels different from the number of wavelength channels specified as above and extract reception signals from such optical signals.

[A1-2] Action and Effects

In the optical network system in the first embodiment of the present invention configured in such a manner as described above, optical signals are transmitted and received through the central node $2$ between the user nodes $3$-$1$ to $3$-$k$.

In particular, the transmission section $3f$ of the user node $3$-$1$ outputs an optical signal of transmission wavelengths $\lambda 1$ to $\lambda 4$ to the central node $2$. Then, the central node $2$ multiplexes the optical signal of the transmission wavelengths $\lambda 1$ to $\lambda 4$ together with light of transmission wavelengths set to the other user nodes $3$-$2$ to $3$-$k$ and outputs the multiplexed optical signal through the central node side branching section $2b$. For example, where an optical signal from the user node $3$-$1$ is to be received by the user node $3$-$2$, the variable wavelength filters $31$ to $3o$ of the reception section $3p$ of the user node $3$-$2$ are set so as to extract signals of the transmission wavelengths $\lambda 1$ to $\lambda 4$ which are wavelength components of the transmission optical signal from the user node $3$-$1$. In this manner, an optical signal can be transmitted and received between the user node $3$-$1$ and the user node $3$-$2$.

At this time, the channels of the transmission wavelengths of the user nodes $3$-$1$ to $3$-$k$ are disposed so as not to overlap with the channels of any other user node while the reception wavelength cannels of each of the user nodes $3$-$1$ to $3$-$k$ can be set arbitrarily by the variable wavelength filters $3h$ to $3k$ from among the wavelength channels disposed so as not to overlap with each other as described above. Therefore, setting of an optical path between arbitrary ones of the user nodes $3$-$1$ to $3$-$k$ can be performed more flexibly and freely than in the prior art systems while the optical network system $1$ has a simple network configuration.

For example, an optical path between the user node $3$-$1$ and an arbitrary one of the other user nodes $3$-$2$ to $3$-$k$ can be set by setting any of the wavelength components to be extracted by the variable wavelength filters $3h$ to $3k$ of the user node $3$-$1$ to one of transmission wavelengths of the arbitrary user node. Further, broadcast transmission or multicast transmission in a unit of a wavelength to a plurality of user nodes $3$-$2$ to $3$-$k$ can be achieved, for example, if one of the variable wavelength filters in the user nodes $3$-$2$ to $3$-$k$ is set so that the wavelength $\lambda 1$ set as a transmission wavelength of the user node $3$-$1$ is set as a wavelength to be extracted as a reception signal.

In this manner, with the optical network system $1$ according to the first embodiment of the present invention, since it includes the central node $2$ and the user nodes $3$-$1$ to $3$-$k$, it can flexibly set connections between arbitrary ones of the user nodes in a unit of a wavelength path with a simple configuration by provisioning in accordance with the network topology of the tree type or the star type, and various services to the user can be accommodated.

Furthermore, also where the number of wavelength channels to be used is to be increased or decreased in individual ones of the user nodes $3$-$1$ to $3$-$k$, the optical network system $1$ can cope with this simply by setting of the fixed wavelength transmission light outputting sections $3a$ to $3d$ and the variable wavelength filters $3h$ to $3k$ without the necessity for alteration of the equipment over the overall optical network system $1$. In particular, since the optical network system $1$ can provide a function of being capable of changing or setting connections flexibly, configuration alteration of the optical network which cannot be implemented readily by conventional systems can be implemented. Consequently, the optical network system $1$ is advantageous in that a flexible and economical network can be implemented.

Further, the configuration is simple and the insertion loss of light passing through the nodes is low, and the number of optical amplifiers to be used for compensation for the loss can be reduced. Consequently, the network cost can be further reduced. Furthermore, the system instruction cost into each user node can be reduced by setting the number of wavelength channels for transmission and reception to a small number.

[A2-1] First Modification to the First Embodiment

Figure 2:
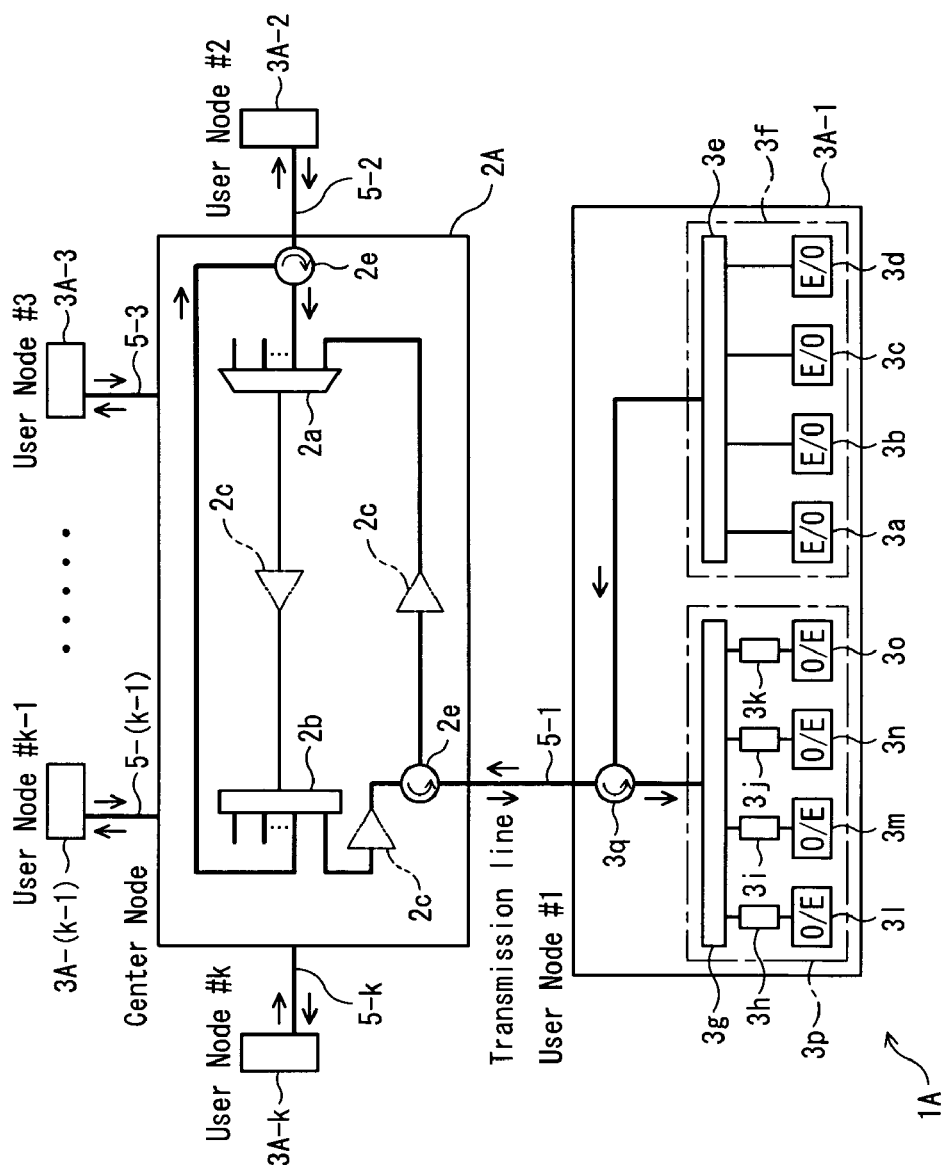
FIGS. 2 to 5 are block diagrams showing optical network systems according to first to fourth modifications to the first embodiment of the present invention, respectively.

FIG. 2 shows a optical network system $1A$ according to a first modification to the first embodiment of the present invention. Referring to FIG. 2, the optical network system $1A$ shown is different from the optical network system $1$ of the first embodiment described above in that transmission lines $5$-$1$ to $5$-$k$ each formed not from two optical fibers but from a single optical fiber are used for connection between the central node $2A$ and the user nodes $3A$-$1$ to $3A$-$k$.

In particular, each of the transmission lines $5$-$1$ to $5$-$k$ is formed from a bidirectionally shared optical fiber, that is, an optical fiber for use for the opposite directions including a direction in which an optical signal propagates from a user node $3A$-$1$ to $3A$-$k$ to the central node $2A$ and another direction in which an optical signal propagates from the central node $2A$ to the user node $3A$-$1$ to $3A$-$k$. Further, the central node $2A$ includes an optical circulator $2e$ which defines the propagation direction of an optical signal between the central node $2A$ and a transmission line $5$-$1$ to $5$-$k$ while each of the user nodes $3A$-$1$ to $3A$-$k$ includes an optical circulator $3q$ which defines the propagation direction of an optical signal between a user node 3A-1 to 3A-k and a transmission line 5-1 to 5-k. It is to be noted that, in regard to the optical circulator 2e, only the optical circulators 2e of the transmission lines 5-1 and 5-2 adjacent the central node 2A and the optical circulator 3q of the user node 3-1 are shown in FIG. 2.

For example, the optical circulator 2e connected to the transmission line 5-1 outputs branched light from the central node side branching section 2b to the transmission line 5-1 and outputs a transmission optical signal from the transmission line 5-1 to the multiplexing section 2a. Meanwhile, the optical circulator 3q of the user node 3-1 outputs a transmission optical signal from the transmission section 3f to the transmission line 5-1 and outputs light from the transmission line 5-1 to the reception section 3p.

Also with the optical network system 1A shown in FIG. 2, since it has such a configuration as described above, transmission and reception of an optical signal can be performed through the central node 2A between the user nodes 3A-1 to 3A-k similarly as in the optical network system 1 described hereinabove with reference to FIG. 1.

Accordingly, with the present modification, similar advantages to those of the first embodiment described hereinabove are achieved by the central node 2A and the user nodes 3A-1 to 3A-k. Also an additional advantage can be achieved that, since the number of optical fibers to be used for the transmission lines 5-1 to 5-k can be reduced to one half, effective utilization of installed optical fibers can be anticipated.

[A2-2] Second Modification to the First Embodiment

Figure 3:
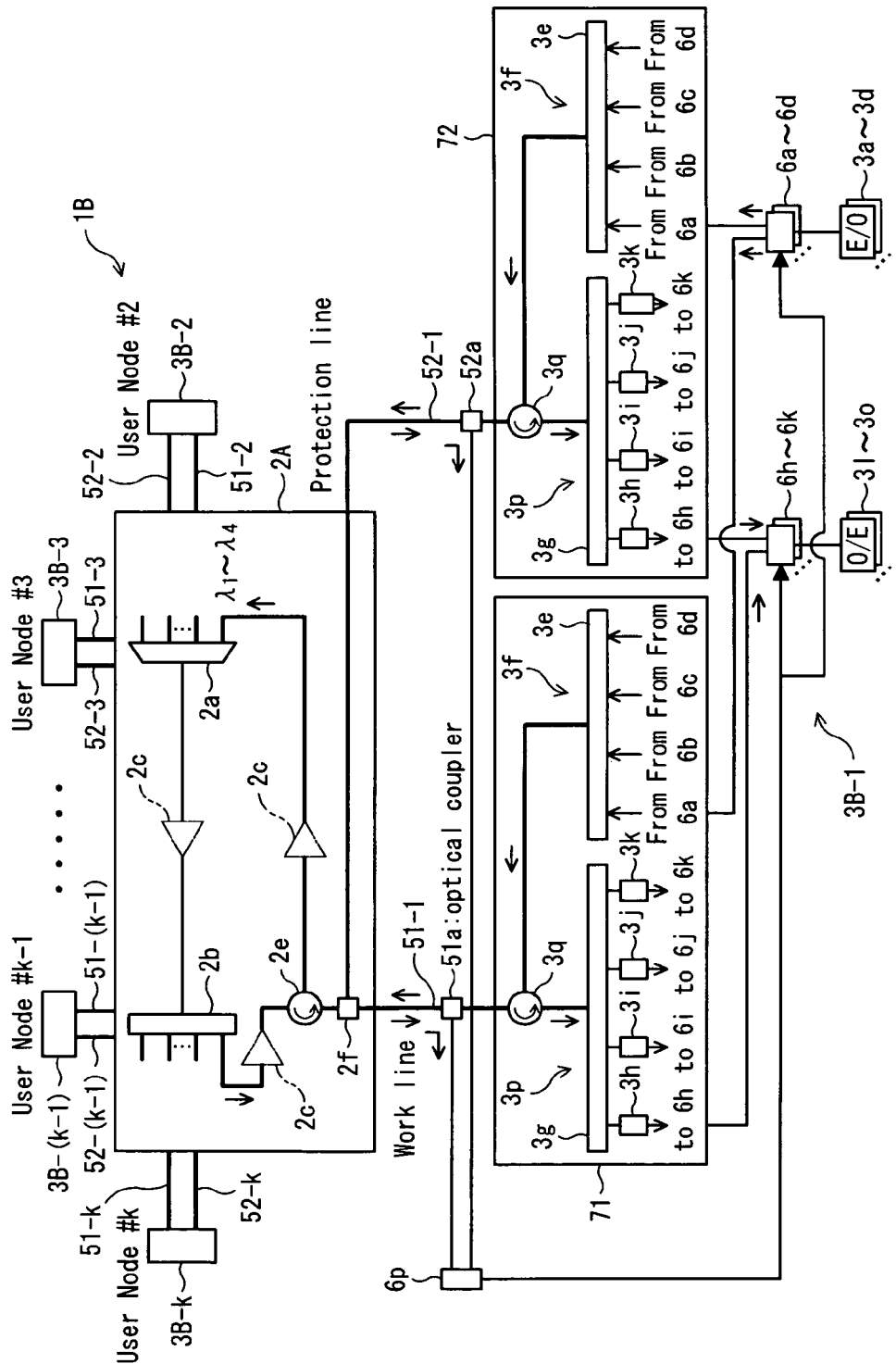

FIG. 3 shows a optical network system 1B according to a second modification to the first embodiment of the present invention. Referring to FIG. 3, the optical network system 1B shown is different from the optical network system 1A described above with reference to FIG. 2 in that it includes transmission lines 51-1, 52-1, . . . , 51-k and 52-k having a redundant configuration and user nodes 3B-1 to 3B-k.

In particular, taking a fault with the transmission lines 51-1, 52-1, . . . , 51-k and 52-k and an apparatus fault with the user nodes 3B-1 to 3B-k into a consideration, a protection function can be provided using switches 6a to 6d and 6h to 6k. By the protection function, the network is constructed at a low cost and with a high degree of reliability with an easy circuit design.

In particular, the central node 2A and the user nodes 3B-1 to 3B-k are connected to each other by the transmission lines 51-1, 52-1, . . . , 51-k and 52-k having the redundant configuration (by the dual configuration), and in a corresponding relationship to the redundant configuration of the transmission lines 51-1, 52-1, . . . , 51-k and 52-k, also the configuration of the transmission sections and the reception sections of the user nodes 3B-1 to 3B-k includes a redundant configuration as dual configuration sections 71 and 72.

Here, if attention is paid to the transmission lines 51-1 and 52-1 which connect the user node 3B-1 and the central node 2A to each other, the transmission lines 51-1 and 52-1 are connected at one end portions thereof to the dual configuration sections 71 and 72 and coupled at the other end portions thereof to each other by an optical coupler 2f.

The dual configuration sections 71 and 72 of the user node 3B-1 provide a dual configuration of the optical circulator 3q, multiplexing section 3e, user node side branching section 3g and variable wavelength filters 3h to 3k which are some of the components of the user nodes 3-1 to 3-k described hereinabove with reference to FIG. 2. Further, the user node 3B-1 includes switches 6a to 6d and 6h to 6k for changing over the dual configuration sections 71 and 72 described hereinabove, and a changeover control section 6p for controlling the changeover of the switches 6a to 6d and 6h to 6k.

It is to be noted that, while also the user nodes 3B-2 to 3B-k include dual configuration sections 71 and 72, switches 6a to 6d and 6h to 6k and a changeover control section 6p similar to those of the user node 3B-1, they are not shown in FIG. 3.

Each of the switches 6a to 6d can selectively output light from the fixed wavelength transmission light outputting sections 3a to 3d to one of the multiplexing sections 3e of the dual configuration sections 71 and 72 described hereinabove under the control of the changeover control section 6p hereinafter described. Also each of the switches 6h to 6k can output a corresponding one of optical signals from the variable wavelength filters 3h to 3k of the dual configuration section 71 and a corresponding one of optical signals from the variable wavelength filters 3h to 3k of the dual configuration section 72 to the reception signal extraction sections 31 to 3o under the control of the changeover control section 6p.

The changeover control section 6p functions as a first anomaly detection section capable of detecting an anomaly of the dual configuration sections 71 and 72 which are configurations of part of the transmission lines 51-1 and 52-1 or the transmission section 3f and the reception section 3p which have a redundant configuration. In particular, the changeover control section 6p monitors part of light propagating in the transmission lines 51-1 and 52-1 described above through optical couplers 51a and 52a to supervise the state of the transmission lines 51-1 and 52-1 or the dual configuration sections 71 and 72 to detect an anomaly of the objects of the supervision.

Then, when the objects of the supervision operate normally, the changeover control section 6p controls the switches 6a to 6d and 6h to 6k so that the transmission line 51-1 and the dual configuration section 71 operate as currently used components while the transmission line 52-1 and the dual configuration section 72 operate as standby (protection) components. On the other hand, if an anomaly occurs with any of the currently used supervision objects because of a trouble or the like, then the changeover control section 6p controls changeover of the switches 6a to 6d and 6h to 6k as a first protection process so that the transmission line 52-1 and the dual configuration section 72 which are in the standby state are used as currently used components.

Accordingly, for example, if an anomaly occurs with one of the variable wavelength filters 3h to 3k of the dual configuration section 71, then the switches 6h to 6k can be controlled so that only an optical signal of a wavelength channel with which the anomaly occurs can be outputted to the reception signal extraction sections 31 to 3o through the variable wavelength filters 3h to 3k of the dual configuration section 72. Consequently, no unnecessary changeover operation occurs with the optical signals of the other wavelength channels which do not suffer from any anomaly.

In the optical network system 1B having the configuration described above, transmission and reception of optical signals are performed through the central node 2A between the user nodes 3B-1 to 3B-k similarly as in the optical network systems described hereinabove with reference to FIGS. 1 and 2. Further, since the configuration of the transmission section 3f and the reception section 3p can be provided with a redundant configuration together with the transmission lines 51-1, 52-1, ..., 51-k and 52-k, the optical network system 1B is enhanced in reliability.

[A2-3] Third Modification to the First Embodiment

Figure 4:
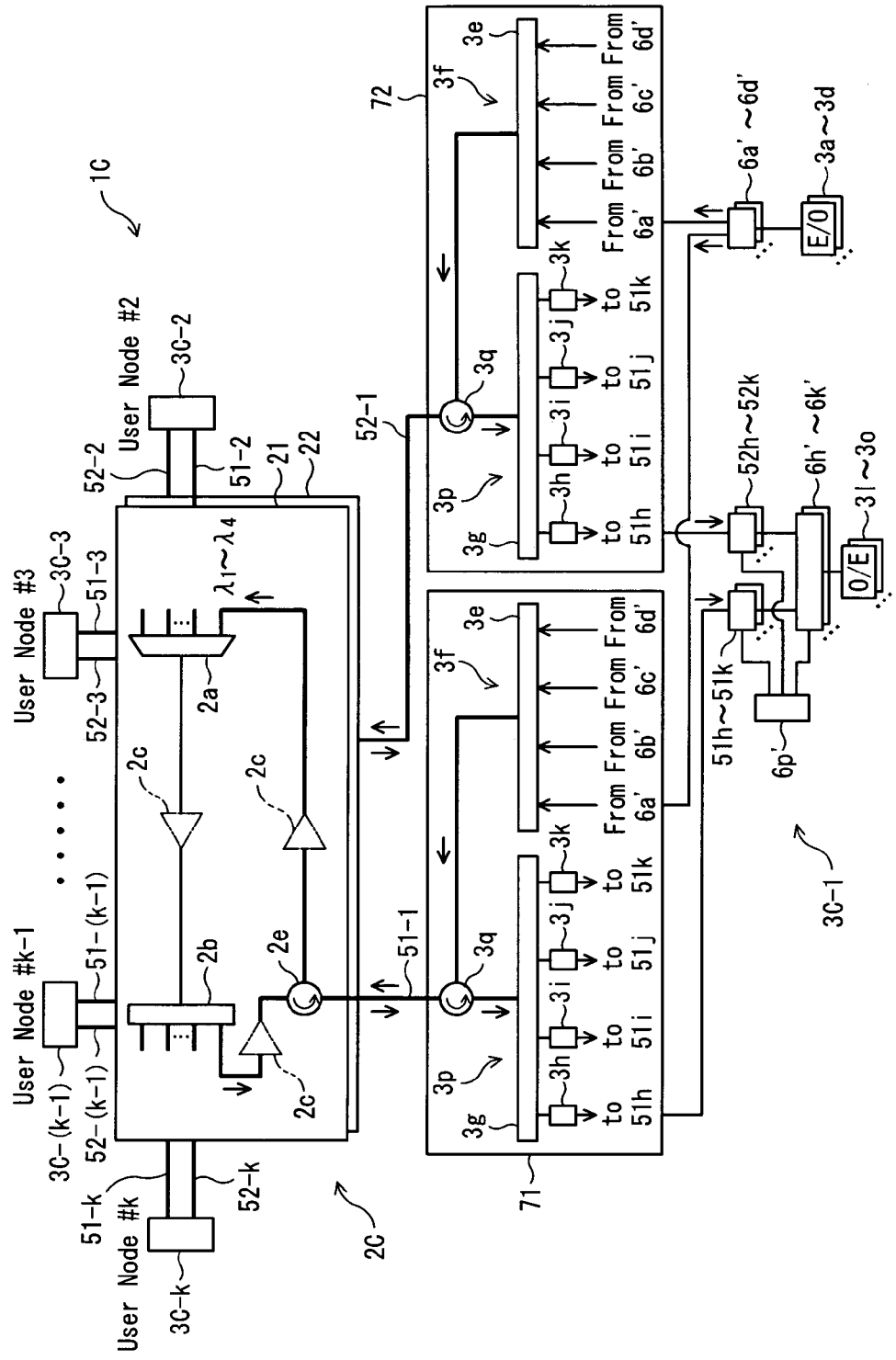

FIG. 4 shows a optical network system 1C according to a third modification to the first embodiment of the present invention. Referring to FIG. 4, in the optical network system 1C shown, the transmission section 3f and the reception section 3p of each of the user nodes 3C-1 to 3C-k have a redundant configuration, and also the transmission lines 51-1, 52-1, ..., 51-k and 52-k and the central node 2C which are used commonly for the opposite directions have a redundant configuration.

In particular, taking a fault with the transmission lines 51-1, 52-1, ..., 51-k and 52-k and an apparatus fault with the central node 2C and the user nodes 3C-1 to 3C-k into a consideration, a protection function of the optical UPSR (Unidirectional Path Switched Ring) type can be provided using optical switches 6h' to 6k' and optical couplers 6a' to 6d'. Consequently, a less expensive and highly reliable network is constructed using an optical UPSR which is easy in circuit design and low in cost.

In particular, the central node 2C includes, as a redundant configuration, dual node sections 21 and 22 having a configuration similar to that of the central node 2A described hereinabove with reference to FIG. 3. The dual node section 21 is connected to the user node 3C-1 through the transmission line 51-1 while the dual node section 22 is connected to the user node 3C-1 through the transmission line 51-2.

Further, each of the user nodes 3C-1 to 3C-k includes fixed wavelength transmission light outputting sections 3a to 3d, reception signal extraction sections 3l to 3o and dual configuration sections 71 and 72 similar to those described hereinabove with reference to FIG. 3. Further, the optical network system 1C includes, as characteristic components of the present modification, branching sections 6a' to 6d', optical couplers 51h to 51k and 52h to 52k, switches 6h' to 6k' and a changeover control section 6p'. It is to be noted that the components of the user nodes 3C-2 to 3C-k are not shown in FIG. 4.

The branching sections 6a' to 6d' branch and output light from the fixed wavelength transmission light outputting sections 3a to 3d to the multiplexing sections 3e which are components of the dual configuration sections 71 and 72.

Meanwhile, each of the optical couplers 51h to 51k branches an optical signal from a corresponding one of the variable wavelength filters 3h to 3k which form the dual configuration section 71 and outputs one of the branched optical signals to a corresponding one of the switches 6h' to 6k' and the other one of the branched optical signals to the changeover control section 6p'. Similarly, each of the optical couplers 52h to 52k branches an optical signal from a corresponding one of the variable wavelength filters 3h to 3k which form the dual configuration section 72 and outputs one of the branched optical signals to a corresponding one of the switches 6h' to 6k' and the other one of the branched optical signals to the changeover control section 6p'.

Further, each of the switches 6h to 6k can output one of an optical signal from a corresponding one of the variable wavelength filters 3h to 3k of the dual configuration section 71 and an optical signal from a corresponding one of the variable wavelength filters 3h to 3k of the dual configuration section 72 to the reception signal extraction sections 3l to 3o under the control of the changeover control section 6p' hereinafter described.

The changeover control section 6p' has a function of monitoring optical signals from the variable wavelength filters 3h to 3k of both of the dual configuration sections 71 and 72 through the optical couplers 51h to 51k and 52h to 52k to supervise an anomaly of the optical signals to be received for each wavelength channel.

When the optical signals of the wavelength channels of the object of the supervision are normal, the changeover control section 6p' controls the switches 6h' to 6k' so that the transmission line 51-1 and the dual configuration section 71 act as currently used (work) components and the transmission line 52-1 and the dual configuration section 72 act as standby (protection) components. In other words, the changeover control section 6p' controls the switches 6h' to 6k' so that optical signals from the variable wavelength filters 3h to 3k of the dual configuration section 71 may be outputted to the reception signal extraction sections 3l to 3o.

On the other hand, if an anomaly occurs with any currently used wavelength channel because of a trouble or the like, then the changeover control section 6p' controls the switches 6h' to 6k' as a second protection process so that the transmission line 52-1 and the dual configuration section 72 which are in a standby state are changed so as to thereafter act as currently used components with regard to the wavelength channel. In other words, the changeover control section 6p' controls the switches 6h' to 6k' so that the optical signals from the variable wavelength filters 3h to 3k of the dual configuration section 72 with regard to the wavelength channel with which the anomaly occurs may be outputted to the reception signal extraction sections 3l to 3o, respectively.

Accordingly, for example, if an anomaly occurs with any one of the variable wavelength filters 3h to 3k of the dual configuration section 71, then the switches 6h' to 6k' are controlled so that only an optical signal of the wavelength channel which suffers from the anomaly can be outputted to the reception signal extraction section 31 to 3o through the variable wavelength filter 3h to 3k. Consequently, a useless changeover action does not occur with regard to optical signals of wavelength channels which do not suffer from any trouble.

In the optical network system 1C having such a configuration as described above, transmission and reception of optical signals can be performed through the central node 2C between the user nodes 3C-1 to 3C-k similarly as in the optical network systems described hereinabove with reference to FIGS. 1 to 3. Further, since a redundant configuration can be provided for the configurations of the central node 2 and the user nodes 3C-1 to 3C-k together with the transmission lines 51-1, 52-1, ..., 51-k and 52-k, the optical network system 1C can be enhanced in reliability.

[A2-4] Fourth Modification to the First Embodiment

Figure 5:
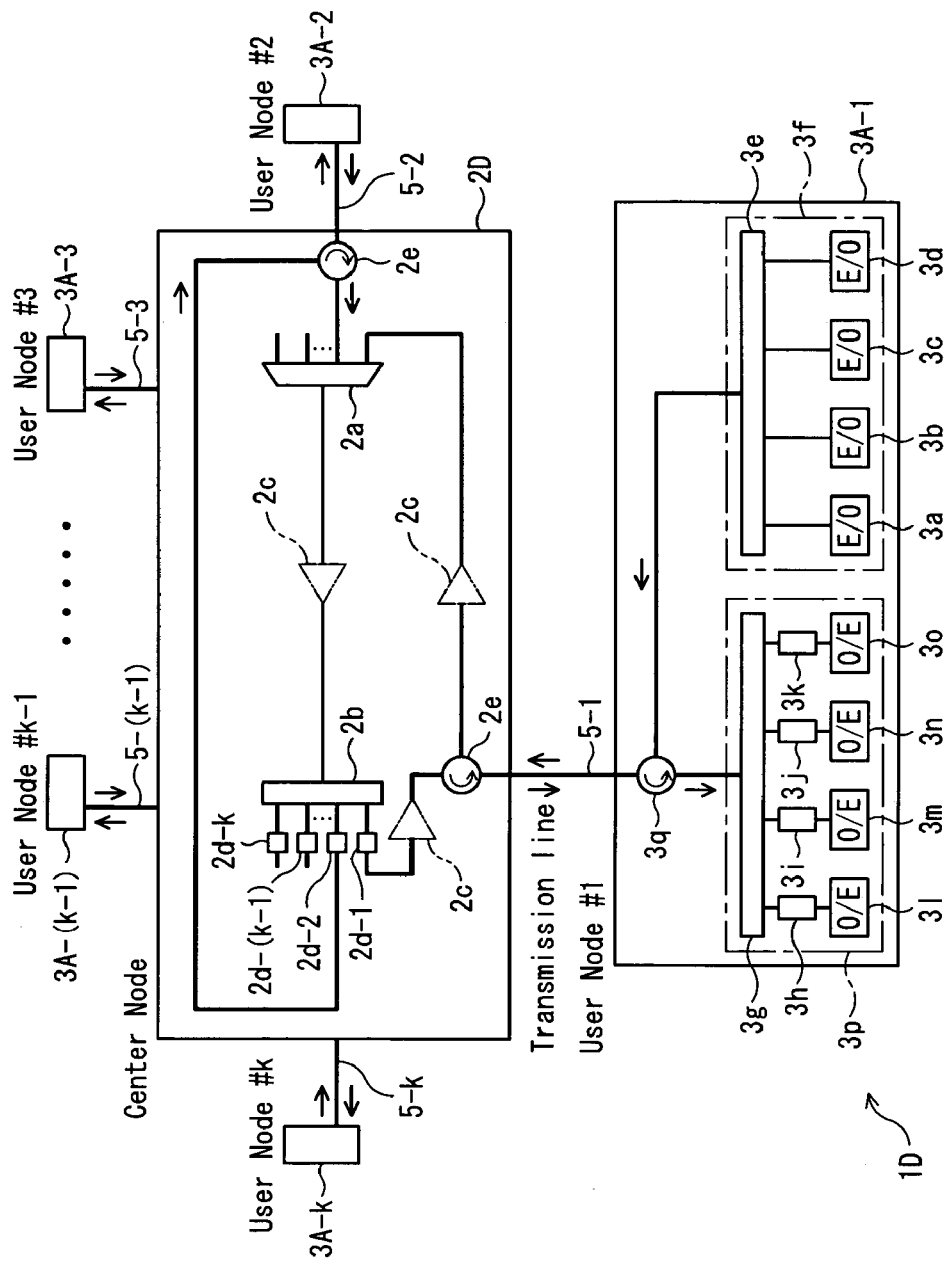

FIG. 5 shows an optical network system 1D according to a fourth modification to the first embodiment of the present invention. Referring to FIG. 5, the optical network system 1D shown is different from the optical network system 1A described hereinabove with reference to FIG. 2 in the configuration of the central node 2D.

In the central node 2D shown in FIG. 5, at a stage preceding to the stage at which branched lights outputted from the central node side branching section 2b are outputted to the optical circulators 2e, reject filters 2d-1 to 2d-k for blocking wavelength components same as the transmission wavelength components of the user nodes 3A-1 to 3A-k which are output destinations of the branched light are interposed, respectively.

In particular, the reject filter 2d-1 blocks components of the transmission wavelengths λ1 to λ4 of branched light from the central node side branching section 2b at the user node 3A-1 but passes light of the other wavelength components other than those of the transmission wavelengths λ1 to λ4 therethrough. The light passing through the reject filter 2d-1 is outputted to the user node 3A-1 through an optical circulator 2e and a transmission line 5-1. Also the other reject filters 2d-2 to 2d-k pass light of wavelength components other than the wavelength components same as the transmission wavelengths of the user nodes 3-1 to 3-k of the output destinations of the branched lights similarly to the reject filter 2d-1 described above so that they are outputted to the corresponding user nodes 3A-2 to 3A-k, respectively.

Also in the central node 2D configured in such a manner as described above, transmission and reception of optical signals can be performed through the central node 2D between the user nodes 3A-1 to 3A-k similarly as in the optical network systems described hereinabove with reference to FIGS. 1 to 4. Further, since the reject filters 2d-1 to 2d-k can remove wavelength components included in branched lights to be outputted to the user nodes 3A-1 to 3A-k from the central node side branching section 2b and having wavelengths same as the transmission wavelengths of the user nodes 3A-1 to 3A-k, occurrence of interference between lights of the same wavelength components propagating in the opposite directions along the transmission lines 5-1 to 5-k can be prevented.

[B1] Second Embodiment

[B1-1] Configuration

Figure 6:
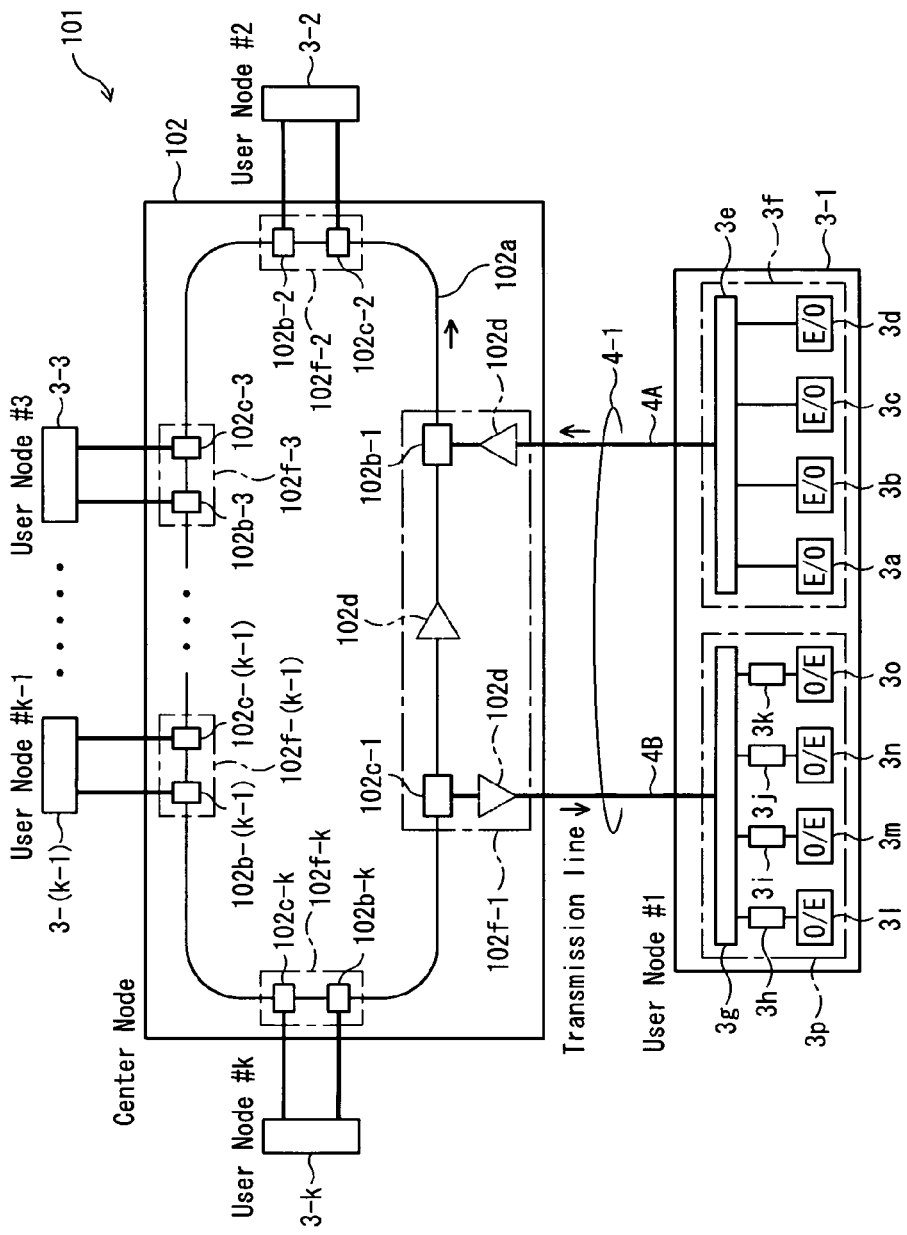
FIG. 6 is a block diagram showing an optical network system according to a second embodiment of the present invention.

FIG. 6 is a block diagram showing an optical network system 101 according to a second embodiment of the present invention. The optical network system 101 shown in FIG. 6 is similar in configuration of user nodes 3-1 to 3-k and transmission lines 4-1 to 4-k to but is different in configuration of a central node 102 from the optical network system 1 described hereinabove with reference to FIG. 1.

The optical network system 101 includes a ring transmission line 102a, and branching/insertion sections 102f-1 to 102f-k provided corresponding to the user nodes 3-1 to 3-k, respectively. The branching/insertion sections 102f-1 to 102f-k include reject/add filters 102b-1 to 102b-k and central node side branching sections 102c-1 to 102c-k, respectively.

The reject/add filters 102b-1 to 102b-k are optical filters each having a function as a central node side multiplexing section for multiplexing (adding) optical signals transmitted from the user nodes 3-1 to 3-k and inputted thereto through the transmission lines 4-1 to 4-k with (to) light on the ring transmission line 102a, and another function as a passage blocking section of blocking (rejecting) passage therethrough of wavelength components of the light propagating along the ring transmission line 102a which are same wavelength components of the optical signals from the corresponding user nodes 3-1 to 3-k to the downstream side. It is to be noted that, for the reject/add filters 102b-1 to 102b-k, for example, a wavelength selectable switch (WSS) can be used.

For example, the reject/add filter 102b-1 which adds a transmission optical signal from the user node 3-1 blocks outputting (passing therethrough) of the wavelength components λ1 to λ4 set to the transmission optical signal from the user node 3-1 from within the light propagated along the ring transmission line 102a from the user node 3-k side to the user node 3-2 side at the next stage. Consequently, the same wavelength is prevented from being multiply circulated along the ring transmission line 102a.

In other words, where optical wavelengths of light to be added are fixed wavelengths as in the second embodiment, wavelengths same as the insertion light wavelengths are blocked by the reject/add filters 102b-1 to 102b-k so that the fixed wavelengths to be added and the wavelengths to pass through may not coincide with each other and thus any insertion wavelength may not circulate the ring transmission line 102a by more than one circulation.

Further, where the reject/add filters 102b-1 to 102b-k having both of a filter function of adding a fixed wavelength and the reject filter function just described are used, the optical loss of node passing light can be reduced. This has a significant effect on enhancement of system performances such as increase of the transmission distance, increase of the number of nodes which can be disposed, reduction of the output level of an insertion light source and reduction of the number of transmission in-line optical amplifiers and reduction of the cost.

It is to be noted that, although it is possible to separate the reject filter function and the add filter function from each other, in this instance, the reject filter function and the add filter function are disposed in this order from the upstream side in the light propagation direction on the ring transmission line 102a.

Further, although the central node side branching sections 102c-1 to 102c-k can power-branch and output light propagating along the ring transmission line 102a to the user nodes 3-1 to 3-k, the central node side branching sections 102c-1 to 102c-k are provided on the upstream side on the ring transmission line 102a with respect to the reject/add filters 102b-1 to 102b-k which add transmission light signals from the user nodes 3-1 to 3-k which make output destinations of branched lights.

It is to be noted that reference character 102d denotes an optical amplifier provided suitably at any necessary location on the light propagation path of the central node 102 (for example, a receiving end of an optical signal from an optical fiber 4A, a transmission end of an optical signal to another optical fiber 4B or on the ring transmission line 102a). Further, an optical amplifier may be interposed suitably as occasion demands also on any of the transmission lines 4-1 to 4-k or on any of light propagation paths in the user nodes 3-1 to 3-k, similarly as in the central node 102.

Since the central node 102 according to the second embodiment includes the ring transmission line 102a, the transmission loss of each of branching/insertion locations (refer to reference characters 102b-1 to 102b-k) for transmission optical signals from the user nodes 3-1 to 3-k can be compensated for suitably by the optical amplifier 102d interposed at each of the branching/insertion locations. Consequently, increase of the number of user nodes which can be connected and extension of the transmission distance of the transmission lines 4-1 to 4-k can be anticipated.

[B1-2] Action and Effects

Also in the optical network system 101 having such a configuration as described above with reference to FIG. 6, transmission and reception of optical signals are performed between the user nodes 3-1 to 3-k through the branching/insertion sections 102f-1 to 102f-k in the central node 102 corresponding to the user nodes 3-1 to 3-k.

In particular, the transmission section 3f of the user node 3-1 outputs an optical signal of the transmission wavelengths λ1 to λ4 which are not set to the other user nodes 3-2 to 3-k to the central node 102. The optical signal of the transmission wavelength λ1 to λ4 is multiplexed with light from the upstream side of the ring transmission line 102a (light having transmission wavelength components of the other user nodes 3-2 to 3-k) by the reject/add filter 102b-1 of the central node 102 and is outputted to the downstream side of the ring transmission line 102a. Further, the central node side branching sections 102c-1 to 102c-k branch and output light propagating along the ring transmission line 102a to the reception sections 3p of the user nodes 3-1 to 3-k, respectively.

Where an optical signal from the user node 3-1 is received, for example, by the user node 3-2, the variable wavelength filters 31 to 3o in the reception section 3p of the user node 3-2 are set so as to extract optical signals of the wavelengths λ1 to λ4 which are wavelength components of the transmission optical signal from the user node 3-1. The optical signal can be transmitted and received between the user node 3-1 and the user node 3-2 in this manner.

At this time, since, in the user nodes 3-1 to 3-k, the channels of the transmission wavelengths can be disposed such that they do not individually overlap with those of the other user nodes and the reception wavelength channels can be set arbitrarily among wavelength channels disposed so as not to overlap with each other as described above, the optical paths can be set more flexibly and freely between the user nodes 3-1 to 3-k than those of the prior art while the optical network system 101 has a simple network configuration similarly as in the case of the first embodiment described hereinabove.

In this manner, with the optical network system 101 according to the second embodiment of the present invention, since it includes the central node 102 and the user nodes 3-1 to 3-k, it exhibits advantages similar to those of the first embodiment described hereinabove. Further, since the central node 102 can successively compensate for the transmission loss of each of branching/insertion locations (refer to reference characters 102b-1 to 102b-k) for transmission optical signals from the user nodes 3-1 to 3-k by inserting the optical amplifiers 102d, increase of the number of user nodes which can be connected and extension of the transmission distance of the transmission lines 4-1 to 4-k can be anticipated.

[B2-1] First Modification to the Second Embodiment

Figure 7:
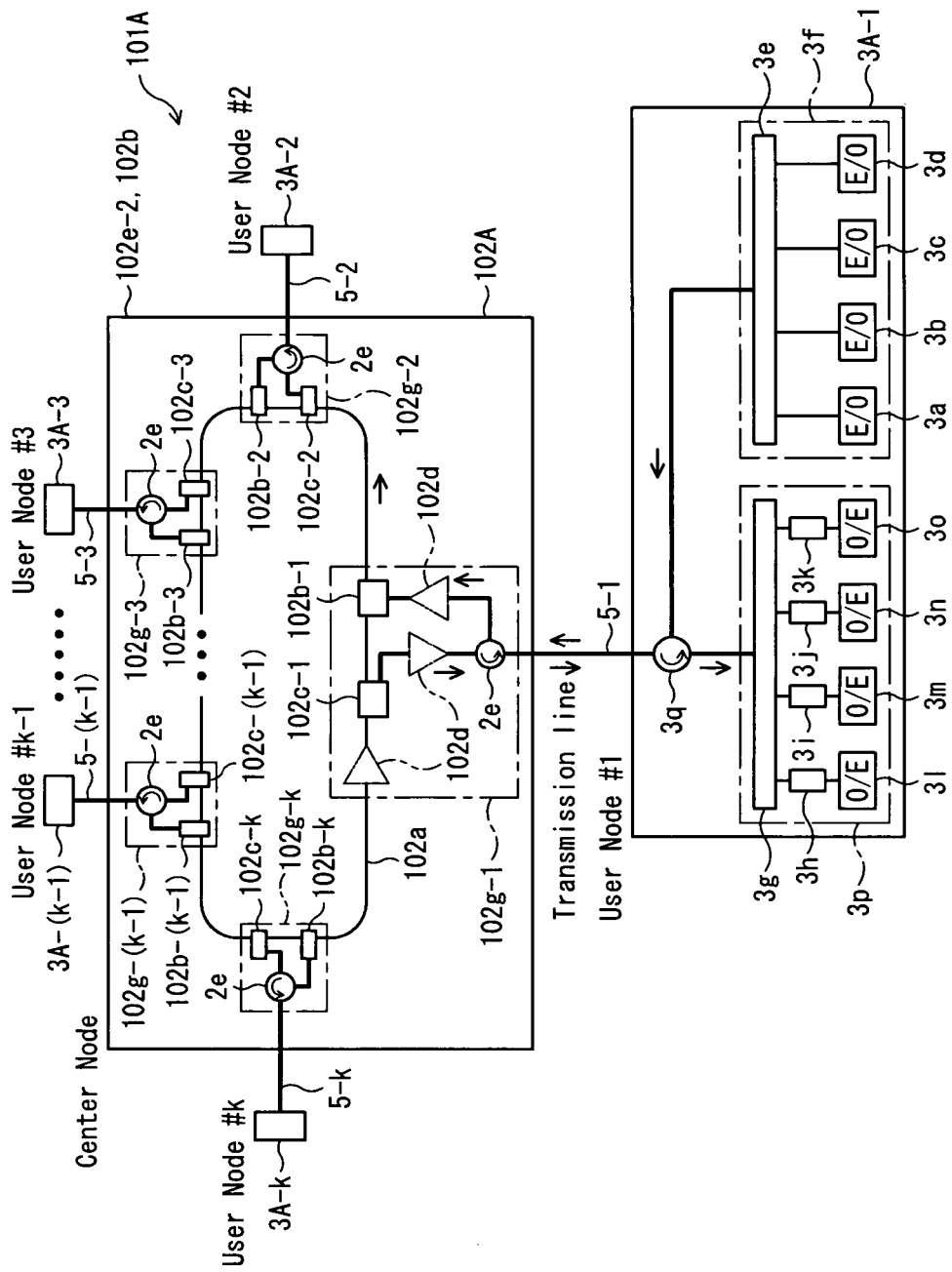
FIGS. 7 to 10 are block diagrams showing optical network systems according to first to fourth modifications to the second embodiment of the present invention, respectively.

FIG. 7 shows an optical network system 101A according to a first modification to the second embodiment of the present invention. Referring to FIG. 7, the optical network system 101A shown is different from that shown in FIG. 6 (refer to reference numeral 101) in that it has a configuration of the transmission lines 5-1 to 5-k similar to that of the modification to the first embodiment described hereinabove with reference to FIG. 2.

In particular, each of branching/insertion sections 102g-1 to 102g-k and user nodes 3A-1 to 3A-k of the central node 102A has an optical circulator 2e or 3q added to the configuration shown in FIG. 6, and each of the transmission lines 5-1 to 5-k is formed from an optical fiber used for commonly for the opposite directions including a direction in which optical signals propagate from the user nodes 3A-1 to 3A-k to the central node 102A and another direction in which optical signals propagate from the central node 102A to the user nodes 3A-1 to 3A-k.

Accordingly, similar advantages to those of the second embodiment described hereinabove are achieved by the central node 102A and the user nodes 3A-1 to 3A-k. Further, since the number of optical fibers which are used for the transmission lines 5-1 to 5-k can be reduced to one half, effective utilization of installed optical fibers can be anticipated.

[B2-2] Second Modification to the Second Embodiment

Figure 8:
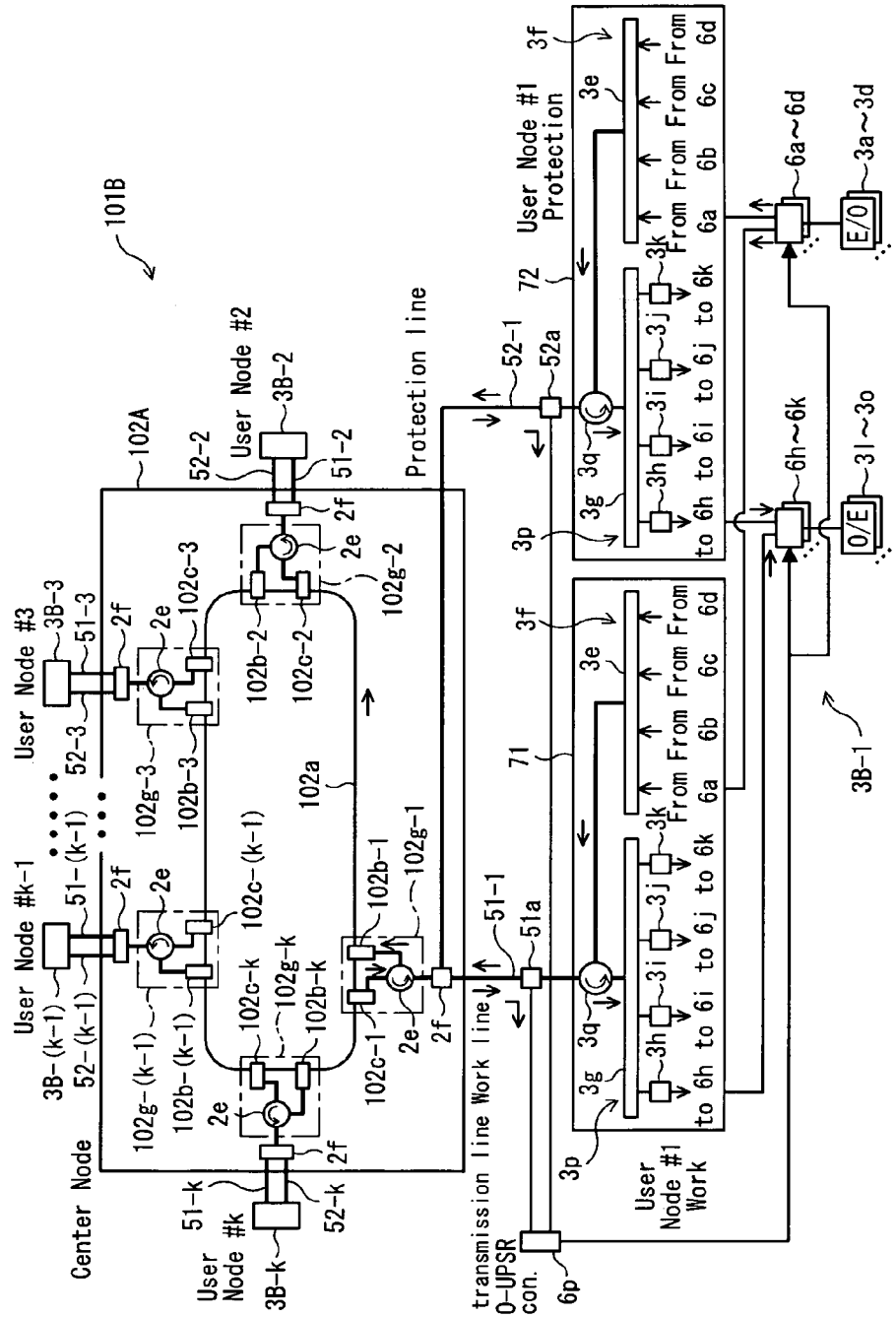

FIG. 8 shows an optical network system 101B according to a second modification to the second embodiment of the present invention. Referring to FIG. 8, the optical network system 101B shown is different from that shown in FIG. 7 (refer to reference character 101A) in that it includes a redundant configuration similar to that of the modification to the first embodiment described hereinabove with reference to FIG. 3.

In particular, dual transmission lines 51-1 and 52-1 are connected to the branching/insertion section 102g-1 of the central node 102A through an optical coupler 2f, and dual transmission lines 51-i and 52-i are connected to each branching/insertion section 102g-i (i=2 to k) of the central node 102A through another optical coupler 2f.

Further, the transmission section and the reception section of each of the user nodes 3B-1 to 3B-k include a redundant configuration as dual configuration sections 71 and 72 similarly as in the case described hereinabove with reference to FIG. 3. In the user node 3B-1, the dual configuration section 71 is connected to the transmission line 51-1 while the dual configuration section 72 is connected to the transmission line 52-1. Similarly, in the user node 3B-1, the dual configuration section 71 is connected to the transmission line 51-i, and the dual configuration section 72 is connected to the transmission line 52-i.

In other words, the central node 102A and the user nodes 3B-1 to 3B-k are connected by transmission lines 51-1, 52-1, . . . , 51-k and 52-k having a redundant configuration according to a dual configuration, respectively, and also the transmission section and the reception section of each of the user nodes 3B-1 to 3B-k include a redundant configuration as dual configuration sections 71 and 72 corresponding to the redundant configuration of the transmission lines 51-1, 52-1, . . . , 51-k and 52-k.

Accordingly, similar advantages to those of the second embodiment described hereinabove are achieved by the central node 102A and the user nodes 3B-1 to 3B-k. Further, transmission and reception of optical signals can be performed through the central node 2 between the user nodes 3B-1 to 3B-k. Furthermore, since a redundant configuration can be provided to the configuration of the transmission section 3f and the reception section 3p together with the transmission lines 51-1, 52-1, . . . , 51-k and 52-k, the optical network system 1B can be enhanced in reliability.

[B2-3] Third Modification to the Second Embodiment

Figure 9:
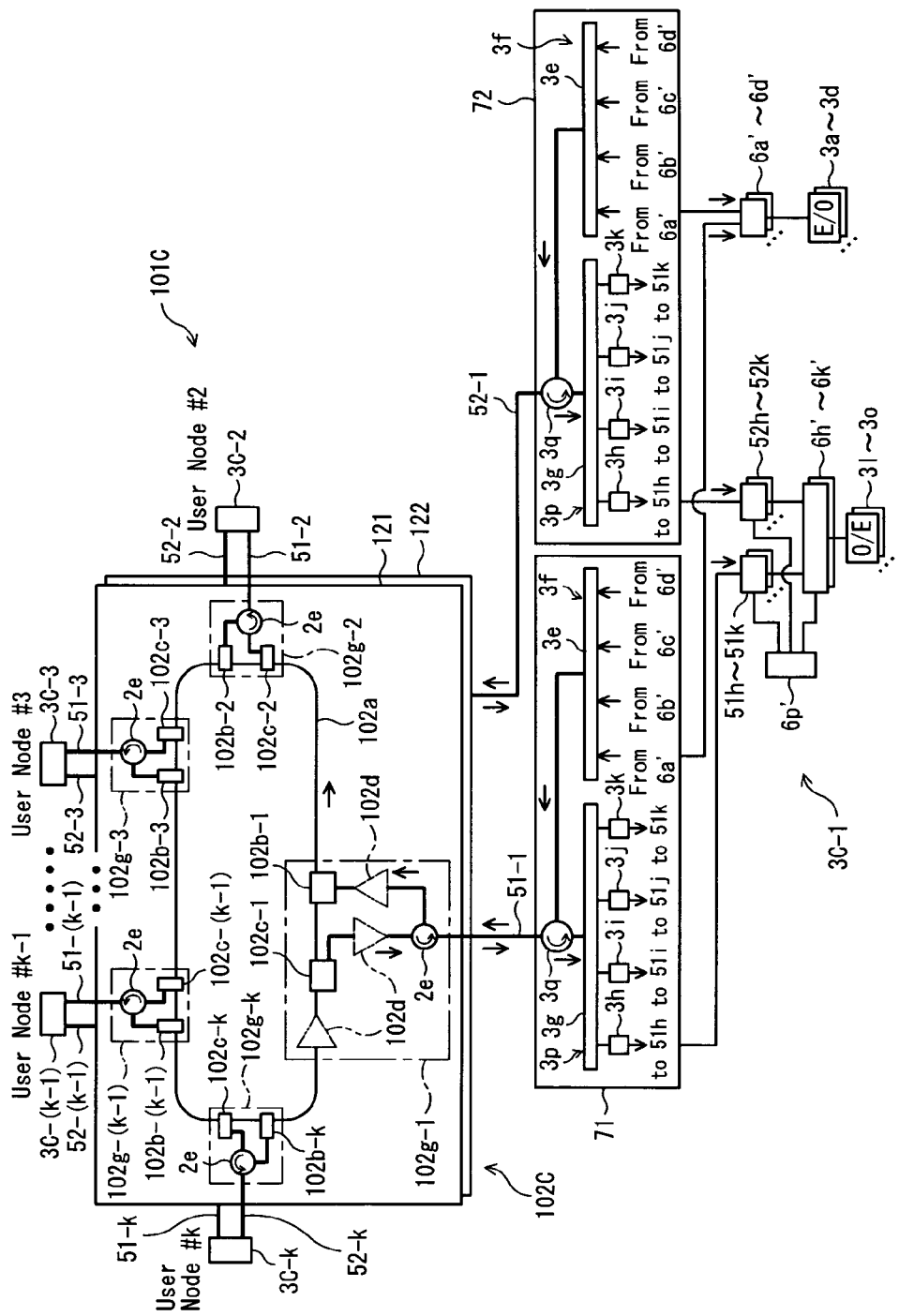

FIG. 9 shows an optical network system 101C according to a third modification to the second embodiment of the present invention. Referring to FIG. 9, the optical network system 101C shown is different from the that described hereinabove with reference to FIG. 7 (refer to reference character 101A) in that it has a redundant configuration similar to that of the modification to the first embodiment shown in FIG. 4.

In particular, the optical network system 101A described hereinabove with reference to FIG. 7 is modified similarly as in that of FIG. 4 such that also the transmission section and the reception section of each of the user nodes 3C-1 to 3C-k have a redundant configuration, the transmission lines 51-i and 52-i (i=1 to k) for use for the opposite directions has a redundant configuration and also the central node 102C has a redundant configuration using dual node sections 121 and 122 of a configuration same as the central node 102a described hereinabove with reference to FIG. 7.

In particular, taking a fault with the transmission lines 51-i and 52-i and an apparatus fault with the user nodes 3C-1 to 3C-k into a consideration, a protection function of the optical UPSR (Unidirectional Path Switched Ring) type can be provided using the optical switches 6h' to 6k' and the optical couplers 6a' to 6d'. By the protection function, the network is constructed at a low cost and with a high degree of reliability using an optical UPSR which is easy in circuit design and low in cost.

Accordingly, in the optical network system 10C, transmission and reception of optical signals can be performed through the central node 102C between the user nodes 3C-1 to 3C-k similarly as in the optical network systems described hereinabove with reference to FIGS. 6 to 8. Further, since a redundant configuration can be applied to the transmission section and the reception section of each of the central node 2C and the user nodes 3C-1 to 3C-k together with the transmission lines 51-1, 52-1, . . . , 51-k and 52-k, the optical network system 101C can be enhanced in reliability.

[B2-4] Fourth Modification to the Second Embodiment

Figure 10:
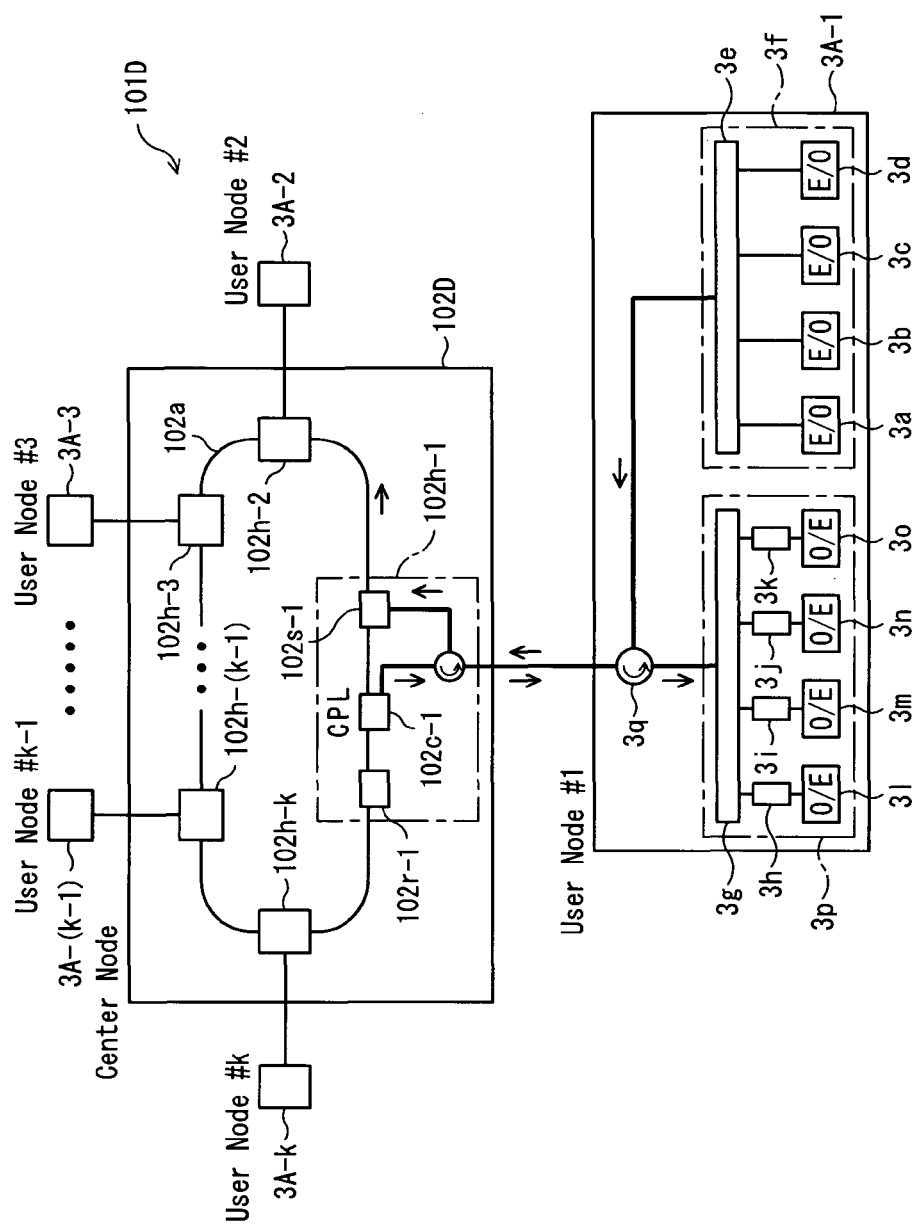

FIG. 10 shows an optical network system 101D according to a fourth modification to the second embodiment of the present invention. Referring to FIG. 10, the optical network system 101D shown is different from the optical network system 101A described hereinabove with reference to FIG. 7 in the configuration of branching/insertion sections 102h-1 to 102h-k of the central node 102D.

In the central node 102D shown in FIG. 10, the functions of the reject/add filters 102b-1 to 102b-k are separated into that of reject filters 102r-1 to 102r-k and that of add filters 102s-1 to 102s-k. In this instance, in each of the branching/insertion sections 102h-1 to 102h-k, a reject filter 102r-1 to 102r-k, a branching section 102c-1 to 102c-k and an add filter 102s-1 to 102s-k are disposed in order from the upstream side in the light propagation direction. It is to be noted that optical circulators 2e for the branching/insertion sections 102h-2 to 102h-k, branching sections 102c-2 to 102c-k, reject filters 102r-2 to 102r-k and add filters 102s-2 to 102s-k are not shown in FIG. 10.

Also with the optical network system 101D, advantages similar to those of the first modification to the second embodiment described above are achieved.

[C1] Third Embodiment

[C1-1] Configuration

Figure 11:
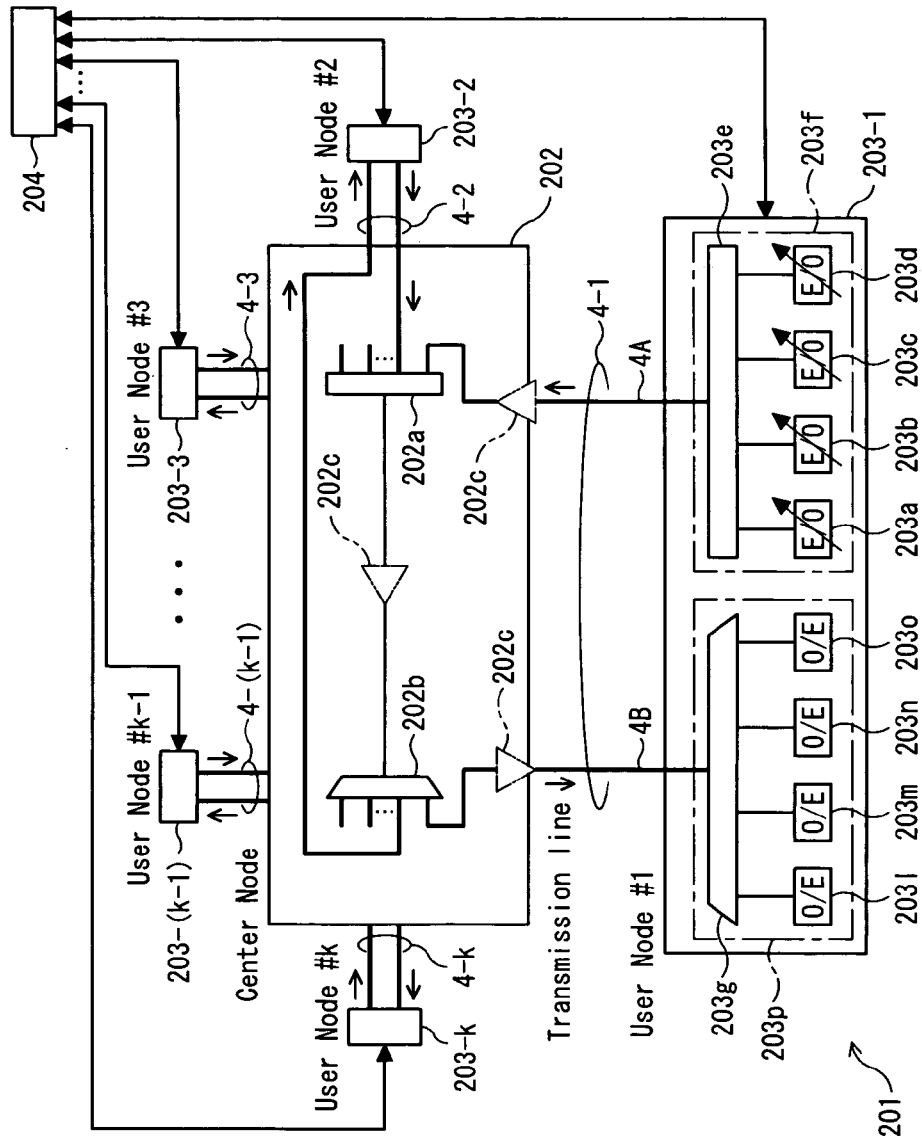
FIG. 11 is a block diagram showing an optical network system according to a third embodiment of the present invention.

FIG. 11 shows an optical network system 201 according to a third embodiment of the present invention. The optical network system 201 shown in FIG. 11 is different from the optical network system 1 of the first embodiment described hereinabove in that optical wavelengths to be extracted as reception signals in user nodes 203-1 to 203-k are fixed and, for example, four different wavelengths which can be set variably are used as transmission wavelengths.

To this end, the optical network system 201 includes a central node 202 and user nodes 203-1 to 203-k having configurations different from those in the first embodiment and further includes a management apparatus 204 for managing the transmission wavelengths to be variably selected in the user nodes 203-1 to 203-k. It is to be noted that transmission lines 4-1 to 4-k for connecting the central node 202 and the user nodes 203-1 to 203-k to each other are similar to those in the first embodiment described hereinabove.

Further, each of the user nodes 203-1 to 203-k includes a transmission section 203f for outputting a transmission signal having optical wavelength components having transmission wavelengths set variably, and a reception section 203p capable of receiving an optical signal from the central node 202. However, in the reception section 203p, wavelengths different from the reception wavelengths of the other user nodes are set. It is to be noted that the transmission section 203f and the reception section 203p in each of the user nodes 203-2 to 203-k are omitted in FIG. 11.

Here, attention is paid to the user node 203-1. In the user node 203-1, the transmission section 203f includes a plurality of (four in the example shown) variable wavelength transmission light outputting sections 203a to 203d capable of outputting optical signals of variable optical wavelengths different from each other, and a user node side multiplexing section 203e for multiplexing optical signals from the variable wavelength transmission light outputting sections 203a to 203d. Each of the variable wavelength transmission light outputting sections 203a to 203d can be formed, for example, from a variable wavelength laser. Meanwhile, the reception section 203p includes a user node side branching section 203g for branching an optical signal from the central node 202 for each reception wavelength, and a plurality of reception signal extraction sections 203l to 203o capable of receiving optical signals of four different wavelength channels λ1 to λ4 of fixed wavelengths.

Also the user nodes 203-1 to 203-k can include, for example, four fixed wavelength transmission light outputting sections. In this instance, each of the individual user nodes 203-1 to 203-k can output four optical signals of wavelength channels different from the transmission wavelengths of the other user nodes. In other words, since the k user nodes 203-1 to 203-k are configured such that the reception wavelengths thereof do not overlap with each other as a whole, for example, 4 k wavelength channels λ1 to λ4k can be set as reception wavelengths.

Further, the management apparatus 204 manages the transmission wavelengths of the user nodes 203-1 to 203-k so that the reception wavelengths of optical signals to be received by each of the user nodes 203-1 to 203-k described hereinabove may be different from the reception wavelengths of the other user nodes, that is, the reception wavelengths may not conflict with each other among the user nodes 203-1 to 203-k. Consequently, each of the user nodes 203-1 to 203-k can set a path arbitrarily to any of the user nodes 203-1 to 203-k of a reception destination by variably setting the transmission wavelengths.

Furthermore, the central node 202 includes a multiplexing section 202a for multiplexing optical signals transmitted from the user nodes 203-1 to 203-k and inputted thereto through the transmission lines 4-1 to 4-k, and a central node side branching section 202b for branching the optical signals multiplexed by the multiplexing section 202a and supplying the branched lights to the user nodes 203-1 to 203-k through the transmission lines 4-1 to 4-k. It is to be noted that the connections between the user nodes 203-3 to 203-k and the multiplexing section 202a and the connections between the user nodes 203-3 to 203-k and the central node side branching section 202b are not shown in FIG. 11.

Although the optical signals inputted from the user nodes 203-1 to 203-k to the multiplexing section 202a are individually set variably, by forming the multiplexing section for multiplexing the optical signals of the variable optical wavelengths from a wavelength selectable switch, otherwise possible interference of the optical wavelengths upon multiplexing can be prevented.

Further, the central node side branching section 202b can be configured such that an optical signal from the multiplexing section 202a is branched for individual reception wavelength components set to the user nodes 203-1 to 203-k of the output destinations. In this instance, the central node side branching section 202b can be formed from a group type demultiplexer or a group type optical coupler or else from a wavelength selectable switch.

In particular, the central node side branching section 202b branches optical signals from the multiplexing section 202a in a unit of a wavelength so that reception wavelength components set fixedly to the user nodes 203-1 to 203-k may be outputted to the corresponding ports which output the branched lights. Consequently, from the branched lights to the user nodes 203-1 to 203-k, wavelength components other than the reception wavelength components can be removed.

Since the central node side branching section 202b can output branched lights with removing wavelength components other than the reception wavelength components as described above, if the user node side branching section 203g of each of the user nodes 203-1 to 203-k described above is configured so as to branch the reception wavelength component inputted thereto through the optical fiber 4B in a unit of a wavelength, then the necessity to provide a filter for each reception wavelength component in the reception section 203p is eliminated.

It is to be noted that reference numeral 202c denotes an optical amplifier provided suitably at any necessary location on any light propagation path of the central node 202 (for example, a receiving end of an optical signal from the optical fiber 4A, a transmission end of an optical signal to the optical fiber 4B or between the multiplexing section 202a and the central node side branching section 202b). Further, an optical amplifier may be interposed suitably as occasion demands also on any of the transmission lines 4-1 to 4-k or on any of light propagation paths in the user nodes 3-1 to 3-k, similarly as in the central node 202.

It is to be noted that each of the user nodes 203-1 to 203-k can suitably select the number of wavelengths and use the selected wavelengths for transmission depending upon the wavelength band to be used from among the wavelengths set as the reception wavelengths, and can suitably select the number of wavelengths depending upon the frequency band to be used for the reception wavelengths. Further, the wavelength channel number (4) of optical signals which can be transmitted in a unit of a user node and the number (4) of wavelength channels from which the reception signals can be extracted are mere examples, and also it is naturally possible to transmit optical signals or extract reception signals the number of which is different from the mentioned wavelength channel numbers.

[C1-2] Action and Effects

Also in the optical network system 201 according to the third embodiment of the present invention having the configuration described above, transmission and reception of optical signals are performed through the central node 202 between the user nodes 203-1 to 203-k.

In particular, the transmission section 203f of the user node 203-1 outputs an optical signal of variably set transmission wavelengths to the central node 202. In the third embodiment, four different transmission wavelengths can be set variably for each user node. Further, the multiplexing section 202a of the central node 202 multiplexes the transmission wavelengths from the user node 203-1 with light of the transmission wavelengths set to the other user nodes 203-2 to 203-k, and the central node side branching section 202b branches the multiplexed transmission wavelengths into reception wavelength components for the individual user nodes 203-1 to 203-k and outputs the branched transmission wavelengths to the reception sections 203p of the corresponding user nodes 203-1 to 203-k.

For example, when the optical signal from the user node 203-1 is received by the user node 203-2, the variable wavelength transmission light outputting sections 203a to 203d in the transmission section 203f of the user node 203-1 are set so as to extract optical signals of wavelengths λ5 to λ8 which are reception wavelength components of the user node 203-2. Consequently, the user node 203-2 can receive optical the signals transmitted from the user node 203-1 through the central node 202.

Consequently, each of the user nodes 203-1 to 203-k can set paths to arbitrary ones of the other user nodes 203-1 to 203-k by arbitrarily setting the transmission wavelengths.

In this manner, also in the optical network system 201 according to the third embodiment of the present invention, since it includes the central node 202 and the user nodes 203-1 to 203-k, it can flexibly set connections between arbitrary ones of the user nodes in a unit of a wavelength path with a simple configuration by provisioning in accordance with the network topology of the tree type or the star type, and various services to the user can be accommodated.

Further, also where the number of wavelength channels to be used is to be increased or decreased in the individual user nodes 203-1 to 203-k, there is no necessity to change the equipment over the entire optical network system 201, but such increase or decrease of the number of wavelength channels can be coped with readily by setting of the variable wavelength transmission light outputting sections 203a to 203d. In particular, since the function of being capable of changing or setting the connections flexibly can be provided, there is an advantage that alteration of the optical network configuration which cannot be implemented readily by conventional systems can be implemented and the network can be constructed flexibly and economically.

Further, since the configuration is simple and the insertion loss of light which passes through a node is low, the number of optical amplifiers for the compensation for the insertion loss can be reduced and the network cost can be further reduced. Further, by setting the number of wavelength channels for transmission and reception in each user node to a small number of wavelengths, the cost for introduction of the system can be reduced.

[C2] Modifications to the Third Embodiment

Figure 12:
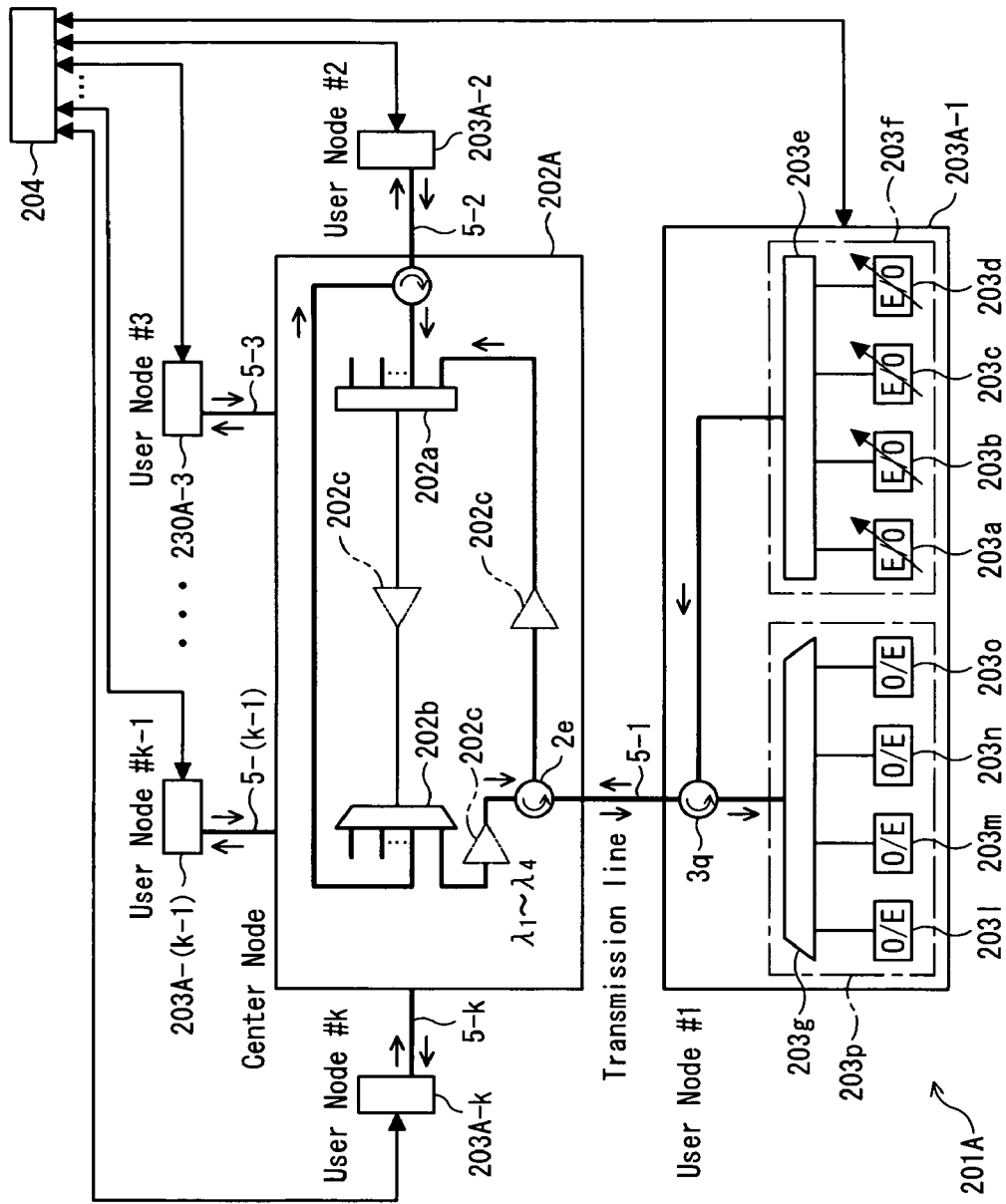
FIGS. 12 to 14 are block diagrams showing optical network systems according to first to third modifications to the third embodiment of the present invention, respectively.

Also in the third embodiment described hereinabove, similarly to the optical network system 1A of FIG. 2 as a modification to the first embodiment, it is possible to form the transmission lines 4-1 to 4-k as transmission lines 5-1 to 5-k, form the central node 202 as a central node 202A to which the optical circulators 2e are added and form the user nodes 203-1 to 203-k as user nodes 203A-1 to 203A-k to each of which an optical circulator 3q is added as in the case of an optical network system 201A shown in FIG. 12.

Figure 13:
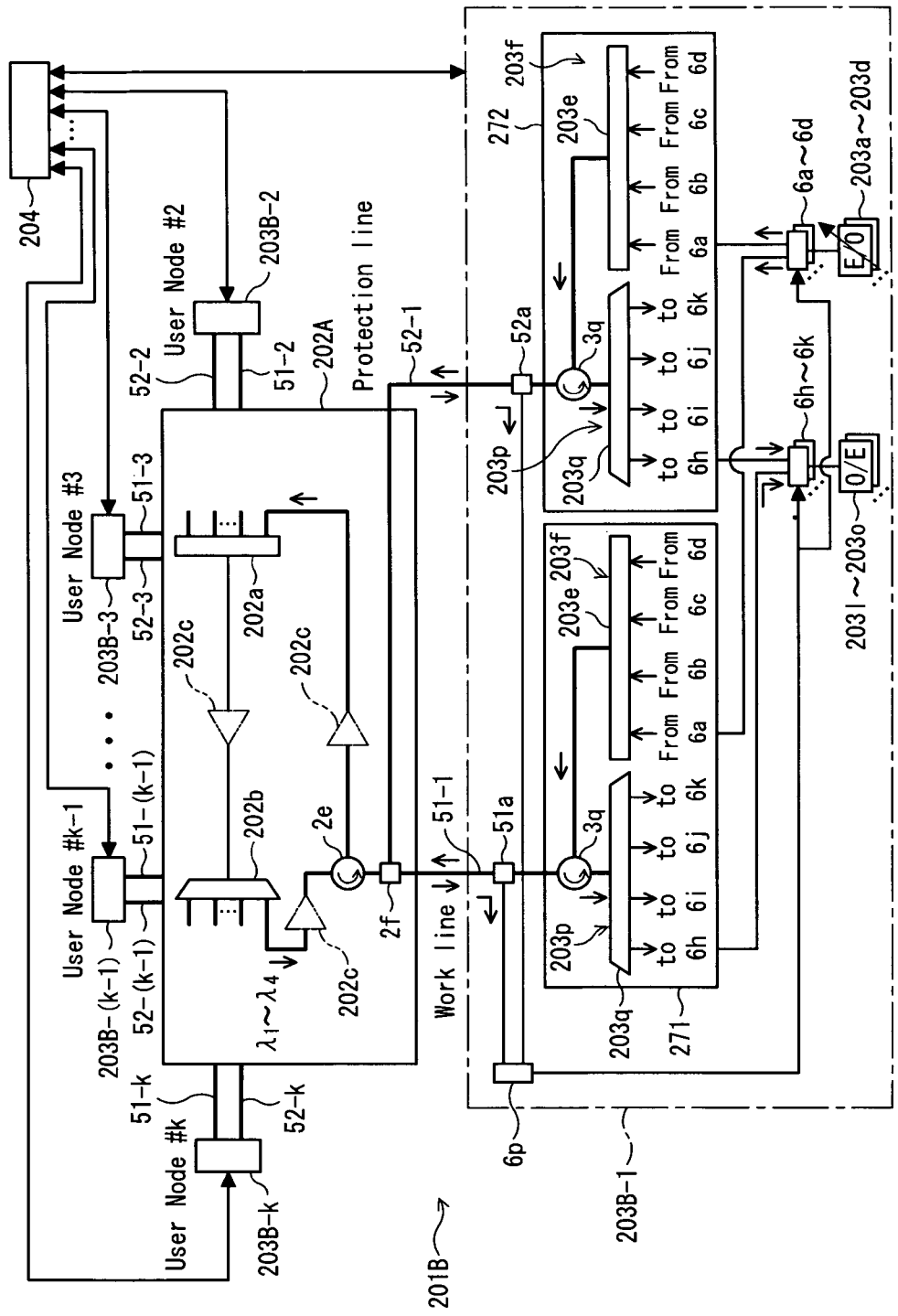

Further, similarly to the optical network system 1B shown in FIG. 3 as another modification to the first embodiment, it is possible to form the transmission section and the reception section of each of the user nodes 203B-1 to 203B-k in a redundant configuration according to the dual configuration sections 271 and 272 and form also the transmission lines 51-i and 52-i (i=1 to k) for use for the opposite directions in a redundant configuration as in the case of an optical network system 201B of FIG. 13.

Figure 14:
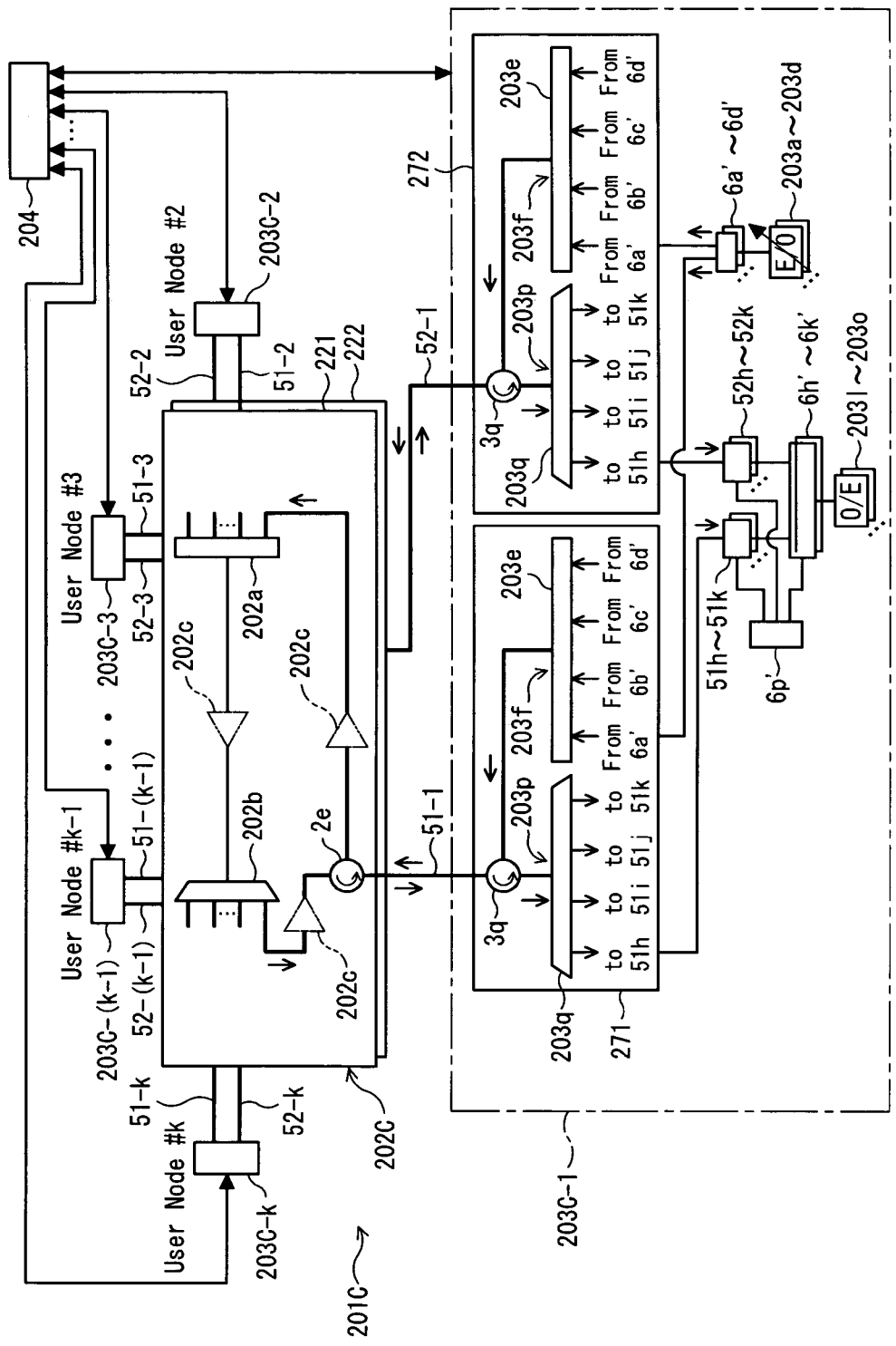

Further, similarly to the optical network system 1C shown in FIG. 4 as a further modification to the first embodiment, it is possible to form the transmission section and the reception section of each of the user nodes 203C-1 to 203C-k in a redundant configuration according to the dual configuration sections 271 and 272 and form also the transmission lines 51-i and 52-i (i=1 to k) for use for the opposite directions in a redundant configuration and besides form a central node 202C in a redundant configuration according to dual node sections 221 and 222 as in the case of an optical network system 201C of FIG. 14.

[D1] Fourth Embodiment

[D1-1] Configuration

Figure 15:
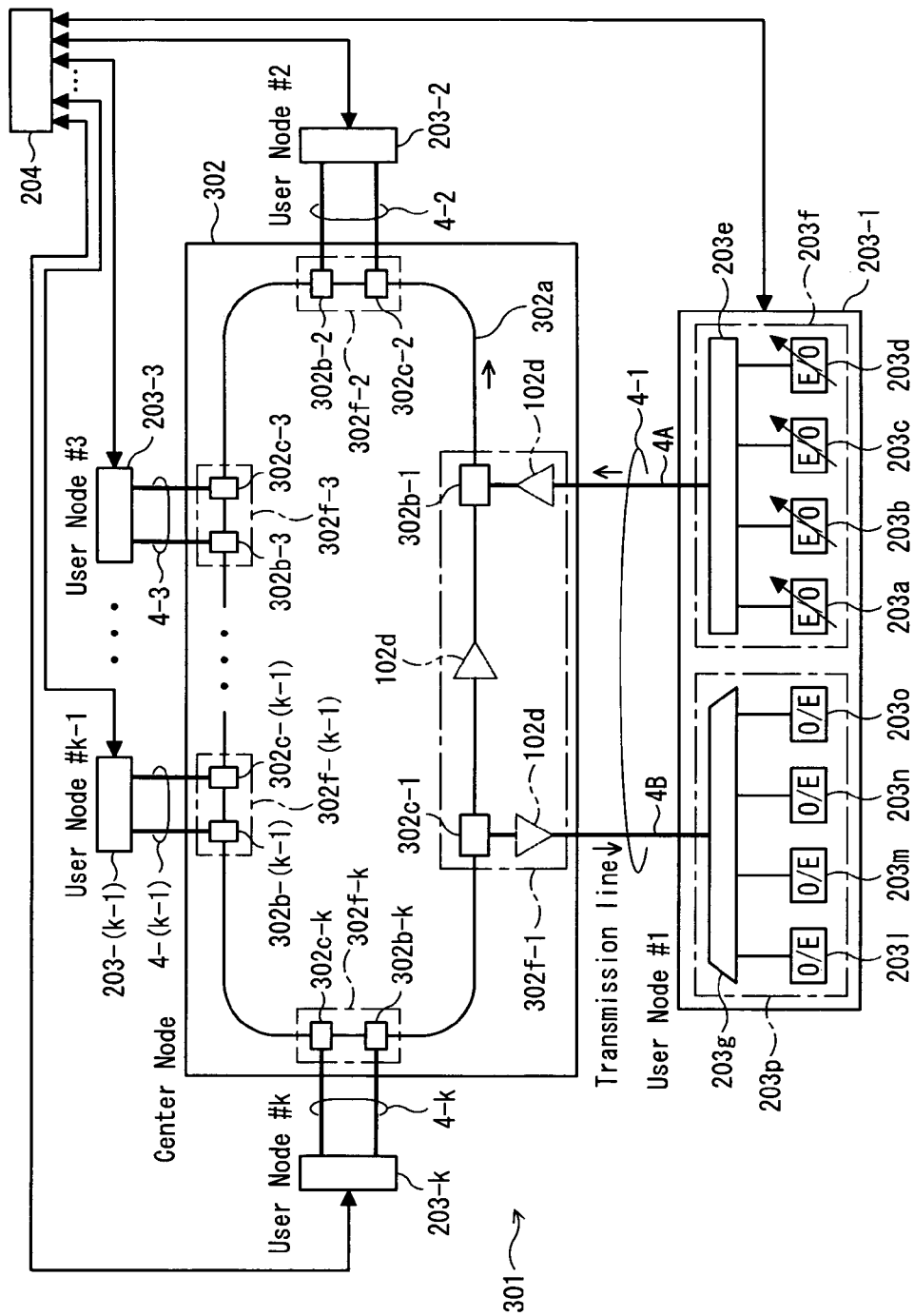
FIG. 15 is a block diagram showing an optical network system according to a fourth embodiment of the present invention.

FIG. 15 shows an optical network system 301 according to a fourth embodiment of the present invention. Referring to FIG. 15, the optical network system 301 shown is a modification to but different from the third embodiment described above in that the user nodes 203-1 to 203-k in the third embodiment are connected to a central node 302 of a configuration different from that of the third embodiment (refer to reference numeral 202) through the transmission lines 4-1 to 4-k.

The central node 302 includes a ring transmission line 302a and branching/insertion sections 302f-1 to 302f-k provided corresponding to the user nodes 203-1 to 203-k, respectively, similarly as in the optical network system 101 in the second embodiment described hereinabove. However, the branching/insertion sections 302f-1 to 302f-k have a configuration different from that of the branching/insertion sections 102f-1 to 102f-k in the second embodiment described hereinabove. In particular, each of the branching/insertion sections 302f-1 to 302f-k includes a central node side multiplexing section 302b-1 to 302b-k, and a reject/drop filter 302c-1 to 302c-k.

The multiplexing section 302b-i of the branching/insertion section 302f-i (i=1 to k) multiplexes an optical signal transmitted from the user node 203-i and inputted thereto through the transmission line 4-i and can be formed, for example, from an optical coupler. Further, each of the reject/drop filters 302c-1 to 302c-k is an optical filter which has both of a function as a central node side branching section for branching reception wavelength components of an optical signal from the upstream side of the ring transmission line 302a for a corresponding one of the user nodes 203-1 to 203-k and another function as a passage blocking section for blocking passage therethrough of wavelength components of an optical signal from the user node 203-i corresponding to the branching/insertion section 302f-i from within light propagating in the ring transmission line 302a to a branching insertion section on the downstream side. The reject/drop filter 302c-i can be formed, for example, from a wavelength selectable switch.

It is to be noted that reference character 102d denotes an optical amplifier provided suitably at any necessary location on the light propagation path of the central node 302 (for example, a receiving end of an optical signal from the optical fiber 4A, a transmission end of an optical signal to the optical fiber 4B or on the ring transmission line 302a). Further, an optical amplifier may be interposed suitably as occasion demands also, same as the central node 302, on any of the transmission lines 4-1 to 4-k or on any of light propagation paths in the user nodes 203-1 to 203-k.

[D1-2] Action and Effects

Also in the optical network system 301 according to the fourth embodiment of the present invention having the configuration described above, transmission and reception of optical signals can be performed through the central node 302 between the user nodes 203-1 to 203-k.

In particular, the transmission section 203f of the user node 203-1 outputs a transmission optical signal having variable wavelengths outputted from the variable wavelength transmission light outputting sections 203a to 203d to the central node 302. The transmission optical signal is multiplexed with light from the upstream side of the ring transmission line 302a (light having the transmission wavelength components of the other user nodes 203-2 to 203-k) by the central node side multiplexing section 302b-1 and outputted to the downstream side of the ring transmission line 302a.

Further, each of the reject/drop filters 302c-1 to 302c-k blocks, from within an optical signal propagated on the upstream side of the ring transmission line 302a, the transmission wavelength components to be multiplexed by the central node side multiplexing section 302b-1 described above and branches an optical signal of the wavelengths λ1 to λ4 set as the reception wavelengths for the user node 203-1 at a stage preceding to the central node side multiplexing section 302b-1, and outputs the branched optical signals to the reception sections 3p of the user nodes 203-1 to 203-k. It is to be noted that the light having the transmission wavelength components of the other remaining user nodes 203-2 to 203-k is outputted as passing light to the central node side multiplexing section 302b-1 described above.

If it is tried to make it possible, for example, for the user node 203-2 to receive an optical signal from the user node 203-1, then the wavelengths λ5 to λ8 set as the reproduction wavelengths at the user node 203-2 are set as transmission wavelengths of the variable wavelength transmission light outputting sections 203a to 203d of the user node 203-1.

Consequently, the branching/insertion section 302f-2 of the central node 302 can branch the wavelength components λ5 to λ8 of the transmission optical signal from the user node 203-1 so that the branched wavelength components can be received by the reception section 203p of the user node 203-2. In this manner, an optical signal can be transmitted and received between the user node 203-1 and the user node 203-2.

In this manner, also in the optical network system 301 according to the fourth embodiment of the present invention, since it includes the central node 302 and the user nodes 203-1 to 203-k, advantages similar to those of the third embodiment described hereinabove can be anticipated. Further, since the central node 302 can successively compensate for the transmission loss of each of branching/insertion locations [refer to reference characters 302b-i and 302c-i (i=1 to k)] for transmission optical signals from the user nodes 203-1 to 203-k by inserting the optical amplifier 102d, increase of the number of user nodes which can be connected and extension of the transmission distance of the transmission lines 4-1 to 4-k can be anticipated.

[D2] Modifications to the Fourth Embodiment

Figure 16:
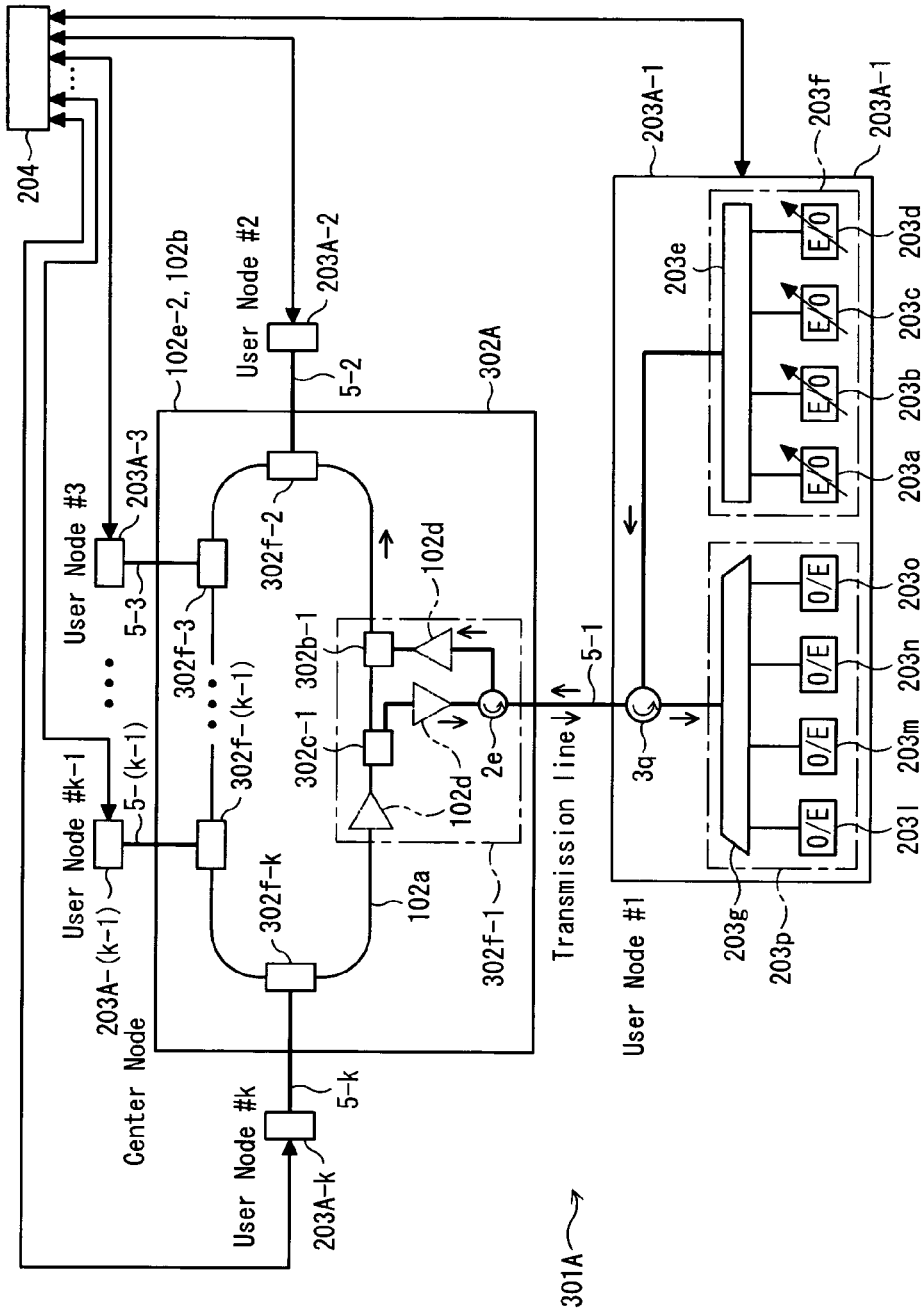
FIGS. 16 to 18 are block diagrams showing optical network systems according to first to third modifications to the fourth embodiment of the present invention, respectively.

Also in the case of the fourth embodiment described hereinabove, similarly to the optical network system 101A of FIG. 7 as a modification to the second embodiment, it is possible to form the transmission lines 4-1 to 4-k as transmission lines 5-1 to 5-k each formed from an optical fiber for use for the opposite directions, form the central node 302 as a central node 302A having branching/insertion sections 302g-1 to 302g-k to each of which an optical circulator 2e is added and form the user nodes 203-1 to 203-k as user nodes 203A-1 to 203A-k to each of which an optical circulator is added as in the case of an optical network system 301A shown in FIG. 16.

Figure 17:
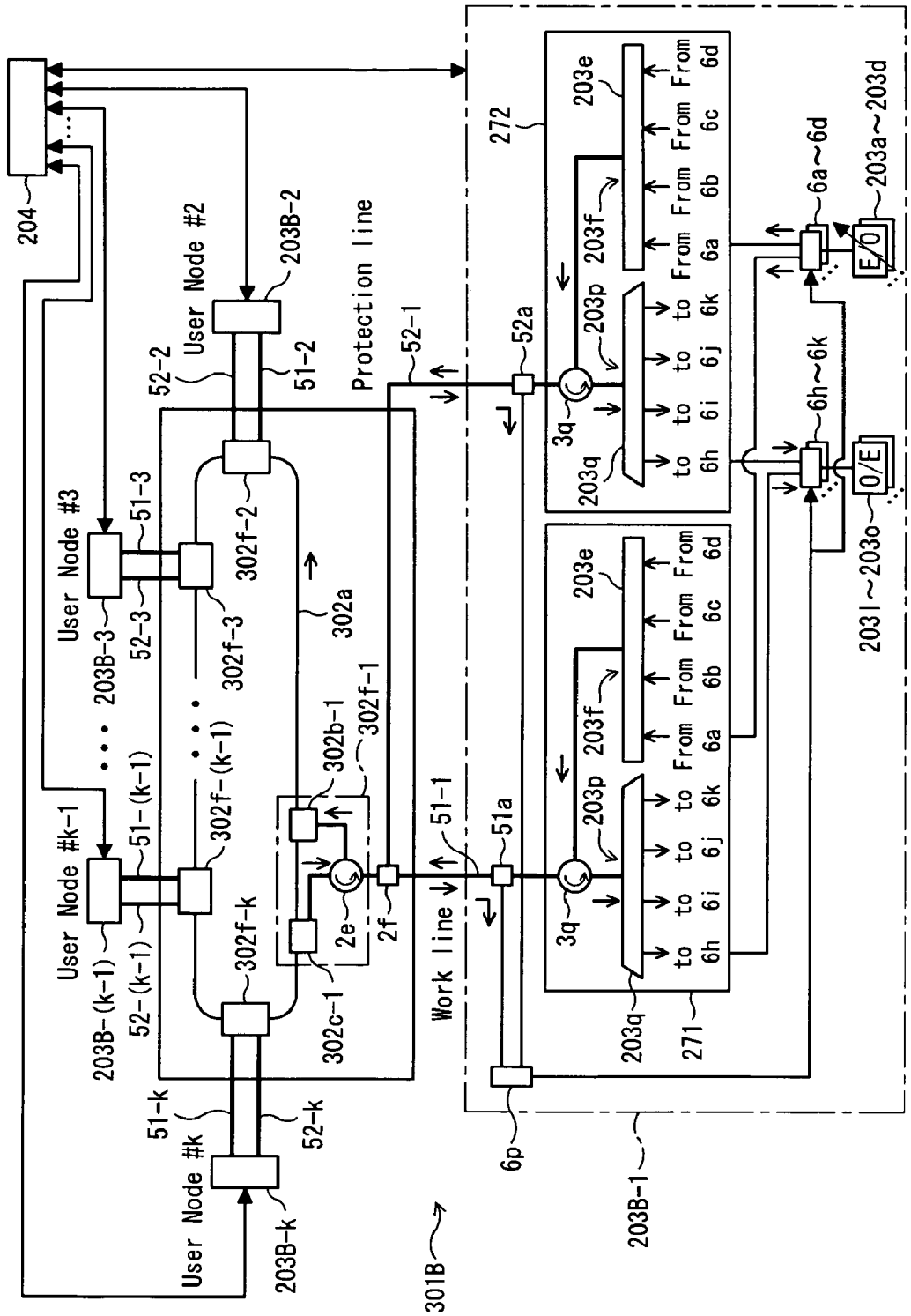

Further, similarly to the optical network system 101B shown in FIG. 8 as another modification to the second embodiment, it is possible to form the transmission section and the reception section of each of the user nodes 203B-1 to 203B-k in a redundant configuration according to the dual configuration sections 271 and 272 and form also the transmission lines 51-i and 52-i (i=1 to k) for use for the opposite directions in a redundant configuration as in the case of an optical network system 301B of FIG. 17.

Figure 18:
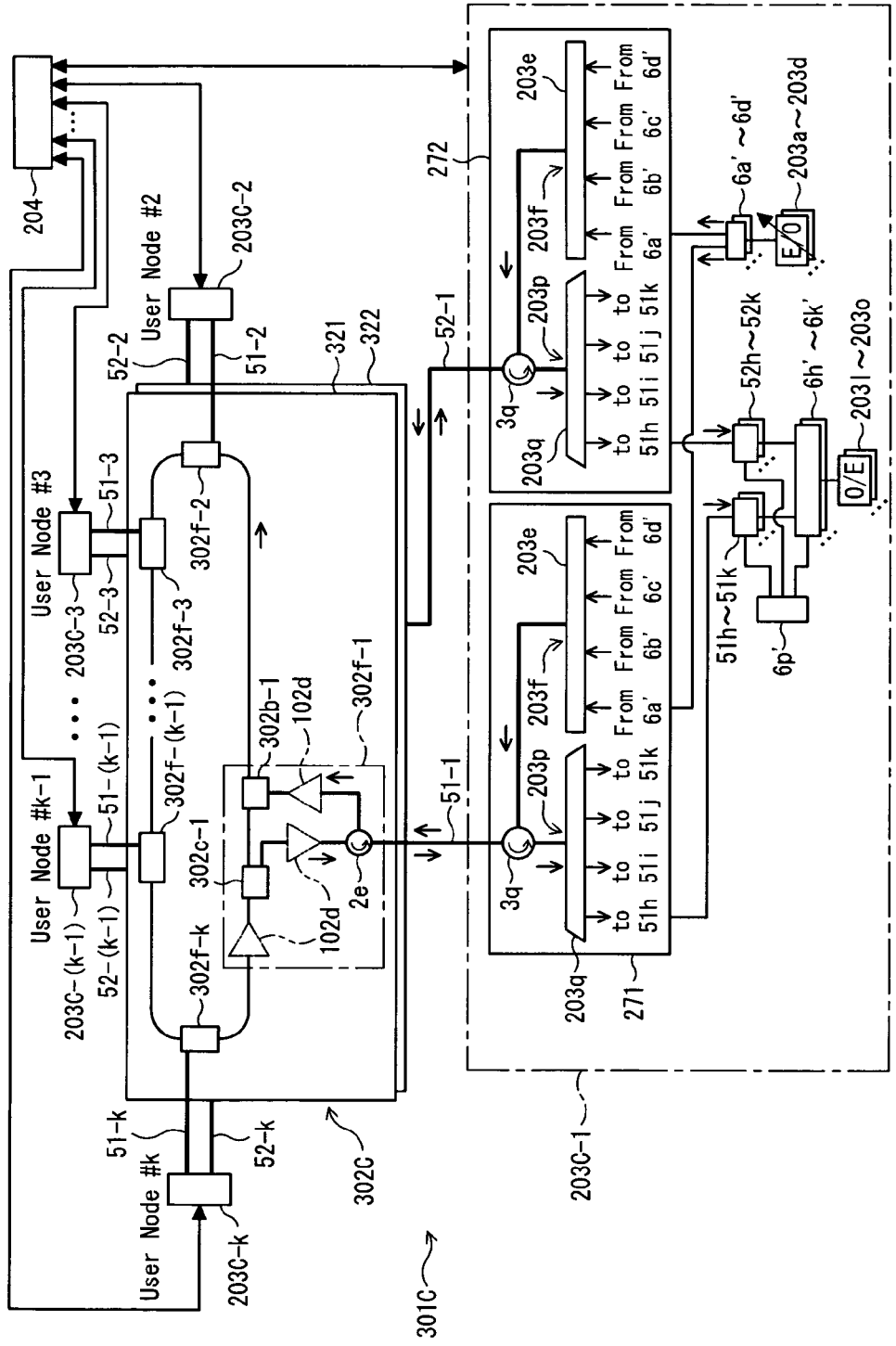
Figure 19:
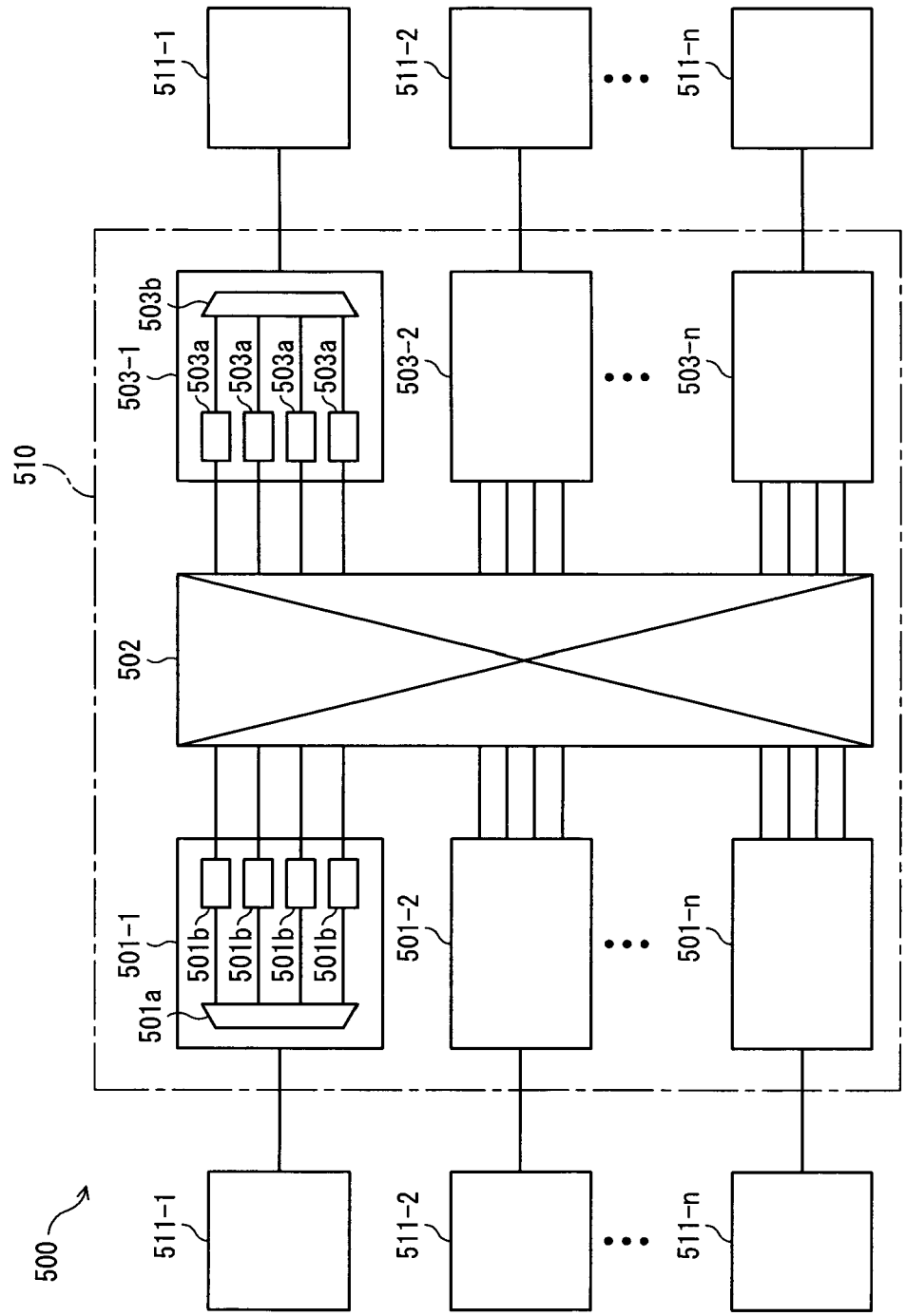
FIG. 19 is a block diagram showing a conventional network.

Further, similarly to the optical network system 101C shown in FIG. 9 as a further modification to the second embodiment, it is possible to form the transmission section and the reception section of each of the user nodes 303C-1 to 303C-k in a redundant configuration according to the dual configuration sections 271 and 272 and form also the transmission lines 51-i and 52-i (i=1 to k) for use for the opposite directions in a redundant configuration and besides form the central node 302C in a redundant configuration according to the dual node sections 321 and 322 as in the case of an optical network system 301C of FIG. 18.

[E] Others

The present invention is not limited to the embodiments specifically described above, and variations and modifications can be made without departing from the scope of the present invention.

Further, the apparatus of the present invention can be produced based on the disclosure of the embodiments described hereinabove.

What is claimed is:

1. An optical network system, comprising:
a central node; and
a plurality of user nodes connected to said central node through transmission lines such that optical signals can be transmitted and received between said user nodes through said central node;
said central node including a ring transmission line and a plurality of branching/insertion sections successively interposed on said ring transmission line for branching/inserting optical signals between said ring transmission line and said user nodes, each of said branching/insertion sections including a central node side multiplexing section for multiplexing optical signals from the corresponding user node with light on said ring transmission line, a passage blocking section for blocking wavelength components of the light propagated along said ring transmission line which correspond to wavelength components of the optical signals from the corresponding user node from passing therethrough to the branching/insertion section on the downstream side, and a central node side branching section for branching and outputting the light propagating along said ring transmission line to the corresponding user node;
each of said user nodes including a transmission section capable of outputting optical signals to which transmission wavelengths different from those of the other user nodes are set and a reception section for extracting selected optical wavelength components from within the branched light supplied thereto from the corresponding central node side branching section and extracting reception signals from the extracted light wavelength components.

2. The optical network system as claimed in claim 1, wherein said transmission section of each of said user nodes includes a plurality of fixed wavelength transmission light outputting sections capable of outputting optical signals having fixed wavelengths different from each other and a user node side multiplexing section for multiplexing the optical signals from said fixed wavelength transmission light outputting sections.

3. The optical network system as claimed in claim 1, wherein a bidirectionally shared optical fiber for connection between said central node and each of said user nodes is provided for said optical transmission lines and has a pair of optical circulators provided at the opposite ends thereof.

4. The optical network system as claimed in claim 3, wherein said transmission section and said reception section of each of said user nodes have a redundant configuration and also said bidirectionally shared optical fiber has a redundant configuration.

5. The optical network system as claimed in claim 3, wherein said transmission section and said reception section of each of said user nodes have a redundant configuration and also said bidirectionally shared transmission line fiber and said central node have a redundant configuration.

6. The optical network system as claimed in claim 1, wherein a star-shaped network topology is formed from said central node and said user nodes.

7. The optical network system as claimed in claim 1, wherein a tree-shaped network topology is formed from said central nodded and said user nodes.

8. The optical network system as claimed in claim 1, wherein said central node side branching section power-branches the light propagated along said ring transmission line and outputs the branched lights to the corresponding user nodes, and said reception section of each of said user nodes includes a user node side branching section capable of power-branching the branched light from said central node into a plurality of lights, a plurality of variable wavelength filters capable of extracting optical wavelength components variably and selectively set from among the lights power-branched by said user node side branching section, and a plurality of reception signal extraction sections for individually extracting reception signals from the optical wavelength components extracted by said variable wavelength filters.

9. The optical network system as claimed in claim 1, wherein said central node side branching section is formed from a wavelength branching filter for branching the optical signals multiplexed by said central node side multiplexing section for individual reception wavelength components set to the corresponding user node, and each of the reception sections of said user nodes includes a user node side branching section for branching the branched light branched by the wavelength branching filter for the individual reception wavelength components and a plurality of reception signal extraction sections for extracting reception signals from the optical signals branched by said user node side branching section.

10. An optical network system, comprising:
a central node; and
a plurality of user nodes connected to said central node through transmission lines such that optical signals can be transmitted and received between said user nodes through said central node;

said central node including a ring transmission line and a plurality of branching/insertion sections successively interposed on said ring transmission line for branching/inserting optical signals between said ring transmission line and said user nodes, each of said branching/insertion sections including a central node side multiplexing section for multiplexing optical signals from the corresponding user node with light on said ring transmission line and a central node side branching section for branching the light propagated along said ring transmission line and outputting the branched light to the corresponding user node, each of said branching/insertion sections being configured so as to block wavelength components of the light propagated along said ring transmission line which correspond to wavelength components of the optical signals from the corresponding user node from passing therethrough to the branching/insertion section on the downstream side;

each of said user nodes including a transmission section capable of outputting a plurality of optical signals having variable optical wavelength components different from each other to said central node and a reception section for extracting optical signals to which reception wavelengths different from those of the other user nodes are set from within the branched light supplied thereto from said central node side branching section and extracting reception signals from the extracted optical wavelength components.

11. The optical network system as claimed in claim 10, wherein said central node side branching section of each of said branching/insertion sections is formed from a reject filter for blocking, from among the optical signals on said ring transmission line, transmission wavelength component to the corresponding user node and a drop filter for branching, from within the optical signal on said ring transmission line, reception wavelength components set to the corresponding user node and passing any other wavelength component therethrough, and said reception section of each of said user nodes includes a user node side branching section for branching the branched light branched by the wavelength branching filter of the corresponding branching and insertion section for the individual reception wavelength components and a plurality of reception signal extraction sections for extracting reception signals from the optical signals branched by said user node side branching section.

12. The optical network system as claimed in claim 10, further comprising a management apparatus for managing transmission wavelengths of said user nodes so that the transmission wavelengths of the optical signals transmitted from each of said user nodes are different from those of other user nodes.

13. The optical network system as claimed in claim 10, wherein said transmission section of each of said user nodes includes a plurality of variable wavelength transmission light outputting sections capable of outputting optical signals of variable optical wavelengths different from each other and a user node side multiplexing section for multiplexing the optical signals from said variable wavelength transmission light outputting sections.

14. The optical network system as claimed in claim 10, wherein a bidirectionally shared optical fiber for connection between said central node and each of said user nodes is provided for said optical transmission lines and has a pair of optical circulators provided at the opposite ends thereof.

15. The optical network system as claimed in claim 14, wherein said transmission section and said reception section of each of said user nodes have a redundant configuration and also said bidirectionally shared optical fiber has a redundant configuration.

16. The optical network system as claimed in claim 14, wherein said transmission section and said reception section of each of said user nodes have a redundant configuration and also said bidirectionally shared transmission line fiber and said central node have a redundant configuration.

17. The optical network system as claimed in claim 10, wherein a star-shaped network topology is formed from said central node and said user nodes.

18. The optical network system as claimed in claim 10, wherein a tree-shaped network topology is formed from said central nodded and said user nodes.

* * * * *